United States Patent
Huang et al.

(10) Patent No.: US 11,906,879 B2
(45) Date of Patent: Feb. 20, 2024

(54) CAMERA MODULE, MOLDED PHOTOSENSITIVE ASSEMBLY AND MANUFACTURING METHOD THEREOF, AND ELECTRONIC DEVICE

(71) Applicant: NINGBO SUNNY OPOTECH CO., LTD., Zhejiang (CN)

(72) Inventors: Zhen Huang, Zhejiang (CN); Zhongyu Luan, Zhejiang (CN); Zongchun Yang, Zhejiang (CN); Fengsheng Xi, Zhejiang (CN); Chenxiang Xu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 172 days.

(21) Appl. No.: 17/603,183

(22) PCT Filed: Mar. 2, 2020

(86) PCT No.: PCT/CN2020/077380
§ 371 (c)(1),
(2) Date: Oct. 12, 2021

(87) PCT Pub. No.: WO2020/207145
PCT Pub. Date: Oct. 15, 2020

(65) Prior Publication Data
US 2022/0179288 A1      Jun. 9, 2022

(30) Foreign Application Priority Data

Apr. 12, 2019 (CN) .......................... 201910292636.0
Apr. 12, 2019 (CN) .......................... 201920493186.7

(51) Int. Cl.
*G03B 17/02* (2021.01)
*B29D 11/00* (2006.01)
(Continued)

(52) U.S. Cl.
CPC ........ *G03B 17/02* (2013.01); *B29D 11/00807* (2013.01); *G03B 13/34* (2013.01); *H04N 23/54* (2023.01)

(58) Field of Classification Search
USPC ...................................... 396/535; 348/207.99
See application file for complete search history.

(56) References Cited

U.S. PATENT DOCUMENTS 9,781,324 B2 * 10/2017 Wang ................ H01L 27/14618
9,826,132 B2 * 11/2017 Wang ................ H01L 27/14627
(Continued)

FOREIGN PATENT DOCUMENTS

CN      105744130      7/2016
CN      207744032      8/2018
(Continued)

OTHER PUBLICATIONS

International Search Report dated May 19, 2020, in International (PCT) Application No. PCT/CN2020/077380, with English translation.
Extended European Search Report dated May 19, 2022, in corresponding European Patent Application No. 20787862.0.

*Primary Examiner* — Clayton E. LaBalle
*Assistant Examiner* — Warren K Fenwick
(74) *Attorney, Agent, or Firm* — Wenderoth, Lind & Ponack, L.L.P.

(57) ABSTRACT

Provided are a camera module, a molded photosensitive assembly and a manufacturing method thereof, and an electronic device. The molded photosensitive assembly is assembled with at least one optical lenses to form a camera module. The molded photosensitive assembly includes an imaging assembly, a molded base, and a filter member. The molded base includes a first molded portion and a second molded portion. The first molded portion embeds a part of the imaging assembly. The second molded portion is inte-
(Continued)

grally formed on a first upper surface of the first molded portion, and the second molded portion has a second upper surface and a second outer side surface. A filter member is attached to the second upper surface of the second molded portion, and corresponds to a photosensitive path of the imaging assembly. The second upper surface of the second molded portion is higher than the first upper surface of the first molded portion, so as to define and form an outer space by a second outer side surface of the second molded portion and the first upper surface of the first molded portion.

20 Claims, 16 Drawing Sheets

(51) Int. Cl.
*G03B 13/34* (2021.01)
*H04N 23/54* (2023.01)

(56) References Cited

U.S. PATENT DOCUMENTS

| | | | |
|---|---|---|---|
| 10,136,041 B2 * | 11/2018 | Wang | H04N 23/55 |
| 10,171,716 B2 * | 1/2019 | Wang | H05K 1/185 |
| 10,666,847 B2 * | 5/2020 | Wang | B29C 33/44 |
| 10,742,859 B2 * | 8/2020 | Wang | B29C 43/18 |
| 2015/0138436 A1 | 5/2015 | Wong | |
| 2018/0007244 A1 | 1/2018 | Wang et al. | |

FOREIGN PATENT DOCUMENTS

| | | |
|---|---|---|
| CN | 207820032 | 9/2018 |
| CN | 109286736 | 1/2019 |
| CN | 209881890 | 12/2019 |
| EP | 3 006 998 | 4/2016 |

\* cited by examiner

```
┌─────────────────────────────────────────────────────────────┐
│ Mounting a group of electronic components 113 on a circuit board │──S400
│ 111 at intervals, wherein each of the electronic components 113 is│
│ respectively and conductively connected to the circuit board 111.│
└─────────────────────────────────────────────────────────────┘
                              │
                              ▼
┌─────────────────────────────────────────────────────────────┐
│   Mounting a photosensitive element 112 conductively to the │──S410
│   circuit board 111 to form an imaging assembly 11.         │
└─────────────────────────────────────────────────────────────┘
                              │
                              ▼
┌─────────────────────────────────────────────────────────────┐
│ Forming a molded base 12 on the imaging assembly 11 by a    │
│ forming mold, wherein the molded base 12 includes a first   │
│ molded portion 121 and a second molded portion 122, and the │
│ first molded portion 121 embeds a part of the imaging assembly│──S420
│ 11, and the second molded portion 122 is integrally formed on a│
│ first upper surface 1211 of the first molded portion 121, and a│
│ second upper surface 1221 of the second molded portion 122 is│
│ higher than the first upper surface 1211 of the first molded│
│ portion 121, so as to define and form an outer space 1201 by the│
│ second outer side surface 1222 of the second molded portion 122│
│ and the first upper surface 1211 of the first molded portion 121.│
└─────────────────────────────────────────────────────────────┘
                              │
                              ▼
┌─────────────────────────────────────────────────────────────┐
│ Attaching a filter member 13 to the second upper surface 1221│──S430
│ of the second molded portion 122 so as to assemble them into a│
│ molded photosensitive assembly 10.                          │
└─────────────────────────────────────────────────────────────┘
                              │                                  ──S440
                              ▼
┌─────────────────────────────────────────────────────────────┐
│ Disposing at least one optical lenses 20 correspondingly on the│
│ molded photosensitive assembly 10.                          │
└─────────────────────────────────────────────────────────────┘
```

Figure 15

CAMERA MODULE, MOLDED PHOTOSENSITIVE ASSEMBLY AND MANUFACTURING METHOD THEREOF, AND ELECTRONIC DEVICE

TECHNICAL FIELD

The present invention relates to technical field of optical imaging, in particular to a camera module, a molded photosensitive assembly, a method for manufacturing the same, and an electronic device.

BACKGROUND ART

In recent years, electronic products, smart devices, etc. are increasingly being developed towards lighter, thinner, and miniaturized. The development trend of electronic products and smart devices proposes more stringent requirements on the size of the camera module, which is one of the standard configurations of electronic products and smart devices. Under this requirement, the molding process and IOM (IR on Molding, filter on molding) process are gradually being applied to the packaging process of camera modules. Firstly, the imaging assembly is packaged by a molding process to form a molded base, and then the filter is directly attached to the molded base so as to assemble them into a molded photosensitive assembly, thereby greatly reducing the thickness of the photosensitive assembly, and decreasing the overall size of the camera module.

For example, as shown in FIG. 1, an existing camera module 1P usually includes an optical lenses 2P and a molded photosensitive assembly 3P; wherein the molded photosensitive assembly 3P includes an imaging assembly 31P, a molded base 32P, and a filter 33P; wherein the molded base 32P covers a part of the imaging assembly 31P after being molded, and the interior of the molded base 32P is recessed downward to form a groove 35P, wherein the filter 33P is directly attached to the groove 35P of the molded base 32P by glue, and a glue layer 34P bonding the filter 33P and the molded base 32P is formed after curing the glue, so as to assemble them into the molded photosensitive assembly 3P. In this way, on the basis of not requiring a lens holder, the existing camera module 1P may complete the assembly of the module only by directly mounting the optical lenses 2P to the top surface of the molded base 32P, thereby reducing the overall size of the camera module. Meanwhile, since the filter 33P is attached to the inside of the groove 35P of the molded base 32P, a distance between the filter 33P and a photosensitive chip 311P of the imaging assembly 31P may be further reduced, thereby facilitating to further reduce the height of the camera module.

However, as shown in FIG. 1, limited by the film in the molding process, the corners of the groove 35P in the molded base 32P (i.e., the junction between the portion of the molded base 32P where the filter 33P is attached and the part where the optical lenses 2P is mounted) is not a right angle, but there is a certain transition arc surface 351P, which makes it difficult for the molded base 32P to provide a flat surface for attaching the filter 33P. Therefore, when attaching the filter 33P, the transition arc surface 351P of the groove 35P in the molded base 32P has to be avoided, so as to ensure that the filter 33P is attached on a flat surface. However, this will cause the attachment area between the filter 33P and the molded base 32P to become smaller, i.e., a bottom supporting area provided by the molded base 32P for the filter 33P becomes smaller, which would reduce a connection strength between the filter 33P and the molded base 32P, thereby affecting the reliability of the camera module.

CONTENTS OF THE INVENTION

One object of the present invention is to provide a camera module, a molded photosensitive assembly, a method for manufacturing the same, and an electronic device, which may eliminate the adverse effects on an attached filter member caused by a transition arc surface on a molded base by elevating a portion on the molded base where the filter member is attached to.

Another object of the present invention is to provide a camera module, a molded photosensitive assembly, a method for manufacturing the same, and an electronic device, which may not need to avoid the transition arc surface on the molded base when attaching the filter member, so as to increase an attachment area between the filter member and the molded base, thereby facilitating to improve the reliability of the camera module.

Another object of the present invention is to provide a camera module, a molded photosensitive assembly, a method for manufacturing the same, and an electronic device, and in an embodiment of the present invention, a notch is formed between a second molded portion and a third molded portion by designing an upper mold of a forming mold, so that the filter member does not need to avoid the transition arc surface on the molded base.

Another object of the present invention is to provide a camera module, a molded photosensitive assembly, a method for manufacturing the same, and an electronic device, and in an embodiment of the present invention, the second molded portion of the molded base of the molded photosensitive assembly is integrally formed on a first molded portion of the molded base, so as to provide a flat attachment surface for the filter member through a second upper surface of the second molded portion, thereby ensuring the attachment flatness of the filter member.

Another object of the present invention is to provide a camera module, a molded photosensitive assembly, a method for manufacturing the same, and an electronic device, and in an embodiment of the present invention, the third molded portion of the molded base of the molded photosensitive assembly is integrally formed on the first molded portion, so as to embed the electronic components on a circuit board of the molded photosensitive assembly, which facilitates to reduce the thickness of the first molded portion, thereby reducing the height of the camera module.

Another object of the present invention is to provide a camera module, a molded photosensitive assembly, a method for manufacturing the same, and an electronic device, and in an embodiment of the present invention, the second molded portion and the third molded portion of the module base of the molded photosensitive assembly are spaced apart, so as to reserve an outer space between the second molded portion and the third molded portion, so that the edge of the filter member is as close as possible to the third molded portion, without needing to avoid the transition arc surface between the third molded portion and the first molded portion, which facilitates to increase the bottom supporting area of the filter member, thereby enhancing the attachment reliability of the filter member.

Another object of the present invention is to provide a camera module, a molded photosensitive assembly, a method for manufacturing the same, and an electronic device, and in an embodiment of the present invention, the second molded portion of the module base of the molded photosensitive assembly may ensure that the filter member is attached to a flat surface and thus does not need to avoid the transition arc surface between the third molded portion and the first molded portion, thereby facilitating to improve the assembly quality of the camera module.

Another object of the present invention is to provide a camera module, a molded photosensitive assembly, a method for manufacturing the same, and an electronic device, and in an embodiment of the present invention, the second molded portion of the molded base is adapted to be provided with a notch so as to form an air escape hole in the process of attaching the filter member, which effectively prevents the filter member from shifting or warping due to the thermal expansion of the gas in the inner space of the molded base.

Another object of the present invention is to provide a camera module, a molded photosensitive assembly, a method for manufacturing the same, and an electronic device, and in an embodiment of the present invention, the notch of the molded base of the molded photosensitive assembly penetrates the second molded portion laterally, so as to form a lateral air escape hole after attaching the filter member, which increase the difficulty of external dust entering the inner space of the molded base through the air escape hole, thereby facilitating to ensure that the photosensitive chip is not contaminated.

Another object of the present invention is to provide a camera module, a molded photosensitive assembly, a method for manufacturing the same, and an electronic device, and in an embodiment of the present invention, a molded reinforcement portion is provided at the notch of the molded base of the molded photosensitive assembly, wherein the molded reinforcement portion extends outward from the second molded portion, so as to fill in glue at the notch after attaching the filter member, thereby facilitating to enhance the attachment strength of the filter member at the notch and improve the reliability of the camera module.

Another object of the present invention is to provide a camera module, a molded photosensitive assembly, a method for manufacturing the same, and an electronic device, and in an embodiment of the present invention, the molded reinforcement portion of the module base of the molded photosensitive assembly may strengthen the connection strength at the notch between the second molded portion and the first molded portion, thereby further enhancing the reliability of the camera module.

Another object of the present invention is to provide a camera module and a molded photosensitive assembly, a method for manufacturing the same, and an electronic device, and in an embodiment of the present invention, the second upper surface of the second molded portion of the molded base is higher than a first upper surface of the first molded portion, so as to form an outer space around the second molded portion, thereby allowing the adhesive to overflow before curing, and facilitating to ensure the imaging quality of the camera module.

Another object of the present invention is to provide a camera module, a molded photosensitive assembly, a method for manufacturing the same, and an electronic device, and in an embodiment of the present invention, the molded base of the molded photosensitive assembly is reserved with an outer space, which facilitates to guide the adhesive to overflow before curing, so as to relieve inward overflow of the adhesive before curing, thereby reducing the adverse effect of the adhesive on the imaging quality of the camera module.

Another object of the present invention is to provide a camera module, a molded photosensitive assembly, a method for manufacturing the same, and an electronic device, and in an embodiment of the present invention, the third molded portion and the second molded portion of the molded base of the molded photosensitive assembly are spaced apart, so that the escape space between the third molded portion and the second molded portion is implemented as the outer space, thereby preventing the third molded portion from blocking the overflow of glue.

Another object of the present invention is to provide a camera module, a molded photosensitive assembly, a method for manufacturing the same, and an electronic device, and in an embodiment of the present invention, the third upper surface of the third molded portion of the molded base of the molded photosensitive assembly is higher than the upper surface of the filter member, so that the third molded portion prevents the optical lenses from hitting the filter member, thereby facilitating to reduce the rupture risk of the filter member.

Another object of the present invention is to provide a camera module, a molded photosensitive assembly, a method for manufacturing the same, and an electronic device, and in an embodiment of the present invention, a fourth molded portion of the molded base of the molded photosensitive assembly is designed according to the installation height of the optical lenses, so as to meet the installation requirements of the optical lenses of the camera module.

Another object of the present invention is to provide a camera module, a molded photosensitive assembly, a method for manufacturing the same, and an electronic device, and in an embodiment of the present invention, the fourth molded portion of the molded base of the molded photosensitive assembly is recessed downward from the first molded portion, so as to reduce the installation height of the optical lenses of the camera module, thereby facilitating to further reduce the height of the camera module.

Another object of the present invention is to provide a camera module, a molded photosensitive assembly, a method for manufacturing the same, and an electronic device, and in order to achieve the above object, the present invention does not need to use expensive materials or complicated structures. Therefore, the present invention successfully and effectively provides a solution that not only provides a simple camera module and a molded photosensitive assembly and manufacturing method thereof and an electronic device, but also enhances the practicality and reliability of the camera module and molded photosensitive assembly and manufacturing method thereof and the electronic device.

In order to achieve at least one of the above objects or other objects and advantages, the present invention provides a molded photosensitive assembly for assembling with at least one optical lenses into a camera module, wherein the molded photosensitive assembly includes:
  an imaging assembly;
  a molded base, wherein the molded base includes:
  a first molded portion, wherein the first molded portion embeds a part of the imaging assembly, and the first molded portion has a first upper surface; and
  a second molded portion, wherein the second molded portion is integrally formed on the first upper surface of the first molded portion, and the second molded portion has a second upper surface and a second outer side surface; and a filter member, wherein the filter member is correspondingly disposed on the second upper surface of the second molded portion;

wherein the second upper surface of the second molded portion is higher than the first upper surface of the first molded portion, so as to define and form an outer space by the second outer side surface of the second molded portion and the first upper surface of the first molded portion.

In an embodiment of the present invention, the molded base further includes a third molded portion, and the third molded portion is integrally formed on the first upper surface of the first molded portion, wherein the third molded portion is located at outer side of the second molded portion, and the third molded portion is spaced apart from the second molded portion.

In an embodiment of the present invention, the second upper surface of the second molded portion is a flat surface.

In an embodiment of the present invention, a distance between a third inner side surface of the third molded portion and the second outer side surface of the second molded portion is not less than 0.01 mm.

In an embodiment of the present invention, a height difference between the second upper surface of the second molded portion and the first upper surface of the first molded portion is 0.03-0.2 mm.

In an embodiment of the present invention, the molded photosensitive assembly further includes an adhesive layer, wherein the adhesive layer is formed by curing an adhesive, and the adhesive layer is located between a lower surface of the filter member and the second upper surface of the second molded portion, so as to attach the filter member to the second upper surface of the second molded portion.

In an embodiment of the present invention, a second inner side surface of the second molded portion is located at outer side of a first inner side surface of the first molded portion, so as to form an inner space inside the second molded portion.

In an embodiment of the present invention, the imaging assembly includes a circuit board, a photosensitive element conductively attached to the circuit board, and a group of electronic components conductively connected to the circuit board, wherein the third molded portion corresponds to the electronic components, and the third upper surface of the third molded portion is higher than the top surface of the electronic components.

In an embodiment of the present invention, the first upper surface of the first molded portion of the molded base is lower than the top surface of the electronic components.

In an embodiment of the present invention, the third outer side surface of the third molded portion of the molded base is located at inner side of the first outer side surface of the first molded portion, so that a part of the first upper surface of the first molded portion outside the third molded portion is used for mounting the optical lenses.

In an embodiment of the present invention, the molded base further includes a fourth molded portion, and the fourth molded portion is recessed downward from the first upper surface of the first molded portion, so as to form a peripheral groove on the outer periphery of the first molded portion; wherein the fourth upper surface of the fourth molded portion is used to provide a mounting surface for mounting the optical lenses.

In an embodiment of the present invention, the molded base further includes a fourth molded portion, and the fourth molded portion extends upward from the first upper surface of the first molded portion, so as to form a peripheral protrusion on the outer periphery of the first molded portion; wherein the fourth upper surface of the fourth molded portion is used to provide a mounting surface for mounting the optical lenses.

In an embodiment of the present invention, the third upper surface of the third molded portion of the molded base is higher than the second upper surface of the second molded portion.

In an embodiment of the present invention, the third upper surface of the third molded portion is higher than the upper surface of the filter member, and the third upper surface of the third molded portion is adapted for corresponding to the optical lenses.

In an embodiment of the present invention, the third molded portion is designed according to the size and position of the electronic components.

In an embodiment of the present invention, the adhesive layer is cured and formed by light curing glue or heat curing glue.

In an embodiment of the present invention, the second molded portion of the molded base is provided with at least one notch, so as to form an air escape hole at the notch of the second molded portion when the filter member is attached to the second upper surface of the second molded portion, so that an internal space of the molded photosensitive assembly is communicated to the outside of the molded photosensitive assembly through the air escape hole.

In an embodiment of the present invention, the second molded portion of the molded base is provided with at least one notch, so as to form an air escape hole at the notch of the second molded portion when the filter member is attached to the second upper surface of the second molded portion by the adhesive layer, so that an internal space of the molded photosensitive assembly is communicated to the outside of the molded photosensitive assembly through the air escape hole.

In an embodiment of the present invention, the notch of the second molded portion extends laterally from the second inner side surface of the second molded portion to the second outer side surface of the second molded portion, so as to form the air escape hole arranged laterally.

In an embodiment of the present invention, the molded base further includes a molded reinforcement portion, and wherein the molded reinforcement portion is formed at the notch of the second molded portion by integrally extending outward from the second molded portion.

In an embodiment of the present invention, the molded reinforcement portion is integrally connected with the first molded portion, so as to form a reinforcement rib between the second outer side surface of the second molded portion and the first upper surface of the first molded portion.

In an embodiment of the present invention, the molded photosensitive assembly further includes a reinforcement adhesive piece, wherein the reinforcement adhesive piece is formed by curing an adhesive applied at the notch of the second molded portion.

According to another aspect of the present invention, the present invention further provides a camera module, which includes at least one optical lenses; and any of the above molded photosensitive assembly, wherein each of the optical lenses is correspondingly disposed on the molded photosensitive assembly, and the optical lenses corresponds to a photosensitive path of the imaging assembly of the molded photosensitive assembly.

In an embodiment of the present invention, the camera module further includes
at least one driver, wherein each of the drivers is assembled on the molded base of the molded photosensitive assembly, and each of the optical lenses is respectively assembled on the driver so as to be assembled into a zoom camera module.

In an embodiment of the present invention, each of the optical lenses includes a lens barrel and a lens group, the lens barrel is disposed on the molded base of the molded photosensitive assembly, and each of the optical lenses is respectively assembled in the lens barrel so as to be assembled into a fixed-focus camera module.

According to another aspect of the present invention, the present invention further provides an electronic device, including:
an electronic device body; and
at least one of the above camera modules, wherein each of the camera modules is disposed in the electronic device body for acquiring images.

According to another aspect of the present invention, the present invention further provides a method for manufacturing a camera module, including the steps:
mounting a photosensitive element conductively to a circuit board to form an imaging assembly;
forming a molded base on the imaging assembly by a forming mold, wherein the molded base includes a first molded portion and a second molded portion, the first molded portion embeds a part of the imaging assembly, the second molded portion is integrally formed on a first upper surface of the first molded portion, and a second upper surface of the second molded portion is higher than the first upper surface of the first molded portion, so as to define and form an outer space by a second outer side surface of the second molded portion and the first upper surface of the first molded portion;
attaching the filter member to the second upper surface of the second molded portion so as to assemble them into the molded photosensitive assembly; and
disposing at least one optical lenses correspondingly on the molded photosensitive assembly.

In an embodiment of the present invention, before the step of forming a molded base on the imaging assembly by a forming mold, the method further includes the step of:
mounting a group of electronic components on the circuit board at intervals, wherein each of the electronic components is respectively and conductively connected to the circuit board.

In an embodiment of the present invention, in the step of forming a molded base on the imaging assembly by a forming mold:
the molded base further includes a third molded portion, wherein the third molded portion is integrally formed on the first upper surface of the first molded portion, and wherein the third molded portion is located at outer side of the second molded portion, and the third molded portion is spaced apart from the second molded portion.

In an embodiment of the present invention, in the step of forming a molded base on the imaging assembly by a forming mold:
the second molded portion of the molded base is provided with at least one notch, wherein the notch extends from a second inner side surface of the second molded portion to the second outer side surface of the second molded portion.

In an embodiment of the present invention, the step of attaching the filter member to the second upper surface of the second molded portion so as to assemble them into the molded photosensitive assembly includes the following steps:
applying an adhesive to the second upper surface of the second molded portion;
disposing the filter member correspondingly on the second molded portion, and forming an air escape hole through the notch of the second molded portion, wherein an internal space of the molded photosensitive assembly is communicated to the outside of the molded photosensitive assembly by the air escape hole; and
heating or irradiating the adhesive to form the adhesive layer between a lower surface of the filter member and the second upper surface of the second molded portion.

In an embodiment of the present invention, the step of attaching the filter member to the second upper surface of the second molded portion so as to assemble them into the molded photosensitive assembly includes the following steps:
applying an adhesive to the lower surface of the filter member;
disposing the filter member correspondingly on the second molded portion, and forming an air escape hole through the notch of the second molded portion, wherein the internal space of the molded photosensitive assembly is communicated to the outside of the molded photosensitive assembly by the air escape hole; and
heating or irradiating the adhesive to form the adhesive layer between the lower surface of the filter member and the second upper surface of the second molded portion.

In an embodiment of the present invention, the step of disposing at least one optical lenses correspondingly on the molded photosensitive assembly includes the following steps:
assembling the optical lenses to a driver; and
assembling the driver correspondingly to the molded base of the molded photosensitive assembly so as to assemble them into a zoom camera module.

In an embodiment of the present invention, the step of disposing at least one optical lenses correspondingly on the molded photosensitive assembly includes the following steps:
assembling a lens barrel of the optical lenses to the molded base of the molded photosensitive assembly so as to assemble them into a zoom camera module, wherein a lens group of the optical lenses corresponds to the photosensitive path of the imaging assembly.

Through the understanding of the following description and the drawings, the further objectives and advantages of the present invention will be fully embodied.

These and other objectives, features and advantages of the present invention are fully embodied by the following detailed description, drawings and the appended claims.

BRIEF DESCRIPTION OF THE DRAWINGS

FIG. 15 is a schematic flowchart of a method for manufacturing a camera module according to an embodiment of the present invention.

SPECIFIC EMBODIMENTS

Figure 1:
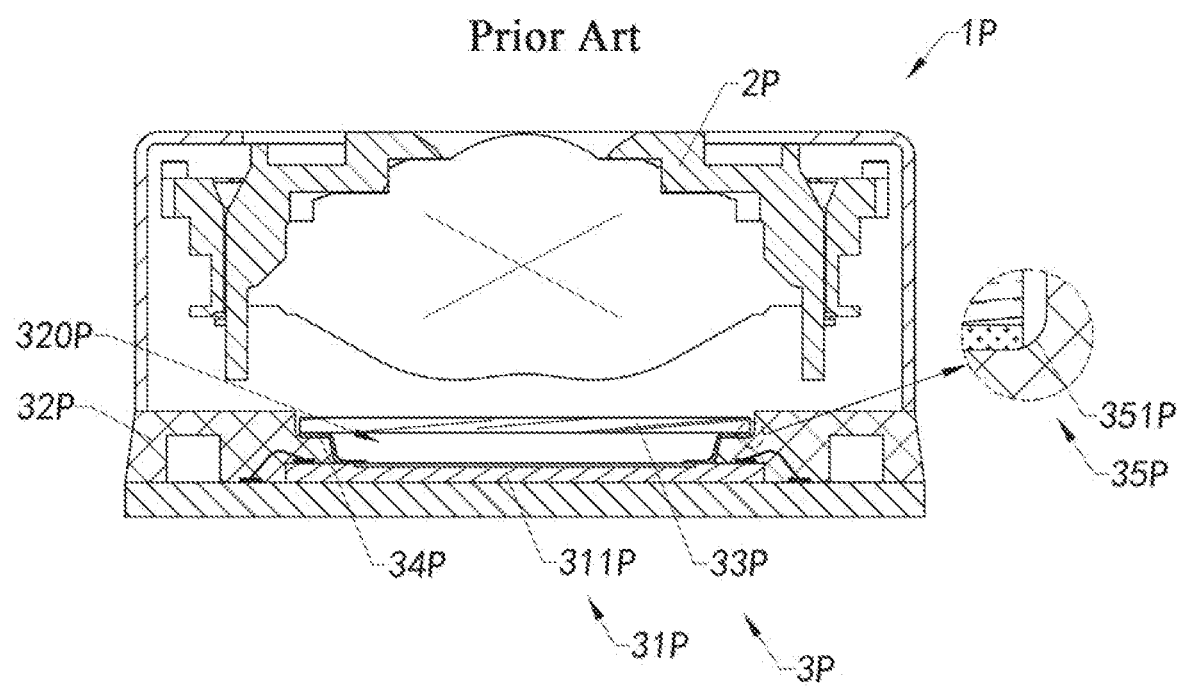
FIG. 1 shows a sectional view of an existing camera module.

The following description is used to disclose the present invention so that those skilled in the art may implement the present invention. The preferred embodiments in the following description are only examples, and those skilled in the art may envisage other obvious variations. The basic principles of the present invention defined in the following description may be applied to other embodiments, modifications, improvements, equivalents, and other technical solutions that do not deviate from the spirit and scope of the present invention.

Those skilled in the art should understand that, in the disclosure of the present invention, the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, which is only for the convenience of describing the present invention and making the description simplified, rather than indicating or implying that the device or element referred to must have a specific orientation, be constructed and operated in a specific orientation, and therefore the above terms should not be construed as limiting the present invention.

In the present invention, the term "a/an" in the claims and specification should be understood as "one or more", i.e., in one embodiment, the number of "an element" may be one; and in another embodiment, the number of "an element" may be more than one. Unless it is clearly stated in the disclosure of the present invention that the number of the element is only one, the term "a/an" cannot be understood as unique or singular, and the term "a/an" cannot be understood as a limitation on the number.

In the description of the present invention, it should be understood that "first", "second", etc. are only used for descriptive purposes, and cannot be understood as indicating or implying relative importance. In the description of the present invention, it should be noted that unless otherwise clearly specified and limited, the terms "junction" and "connection" should be understood in a broad sense. For example, it may be a fixed connection, a detachable connection, or an integral connection; it may be a mechanical connection or an electrical connection; it may be a direct connection or an indirect connection through a medium. For those of ordinary skill in the art, the specific meaning of the above terms in the present invention should be understood according to specific circumstances.

In the description of this specification, descriptions with reference to the terms "one embodiment", "some embodiments", "examples", "specific examples", or "some examples" etc. mean a specific feature, structure, material or characteristic described in conjunction with the embodiment or example is included in at least one embodiment or example of the present invention. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art may combine and incorporate the different embodiments or examples and the features of the different embodiments or examples described in this specification without contradicting each other.

With the increasing maturity of the molding process, IOM (IR on Molding, filter on molding) technology has gradually been applied to the packaging process of camera modules to pursue the development trend of miniaturization, lightness and thinness. In particular, as shown in FIG. 1, in order to further reduce the height of an existing camera module 1P, usually a part of a molded base 32P where a filter 33P is attached is recessed downward to form a groove 35P, so that a part of the mold base 32P where the filter 33P is attached is lower than a part where optical lenses 2P is mounted, so that the mold base 32P is formed into a concave stepped structure, thereby minimizing a distance between the filter 33P and a photosensitive chip 311P of an imaging assembly 31P.

However, since the corners of the groove 35P of the molded base 32P are not right angles, a transition arc surface 351P is formed at the corners of the groove 35P due to the coating process during the molding process, so that the transition arc surface 351P will inevitably affect the molded base 32P to provide a flat attachment surface. Therefore, when attaching the filter 33P, the filter 33P has to avoid the transition arc surface 351P on the molded base 32P, so as to ensure that the filter 33P is smoothly attached to the molded base 32P. However, in order to avoid the transition arc surface 351P of the groove 35P, an edge of the filter 22P will have to be far away from an outer side wall of the groove 35P, so that a contact area between the filter 33P and the mold base 32P has to be reduced, i.e., a bottom supporting area of the filter 33P has to be reduced, resulting in a significant reduction in a connection strength between the filter 33P and the molded base 32P, which in turn affects the reliability of the camera module.

Therefore, in order to solve the above problems, the present invention provides a camera module, a molded photosensitive assembly and a manufacturing method thereof, so as to eliminate the adverse effects of a transition arc surface generated by coating during a molding process on a filter member. Particularly, as shown in FIGS. 2-4, a camera module 1 according to a first embodiment of the present invention is illustrated, wherein the camera module 1 includes a molded photosensitive assembly 10 and at least one optical lenses 20, wherein the molded photosensitive assembly 10 includes an imaging assembly 11, a molded base 12, and a filter member 13, wherein the molded base 12 is molded on the imaging assembly 11, and the filter member 13 is attached to the molded base 12; and the optical lenses 20 is correspondingly disposed on the molded photosensitive assembly 10, and the optical lenses 20 corresponds to a photosensitive path 110 of the imaging assembly 11 so as to be assembled into the camera module 1.

Figure 2:
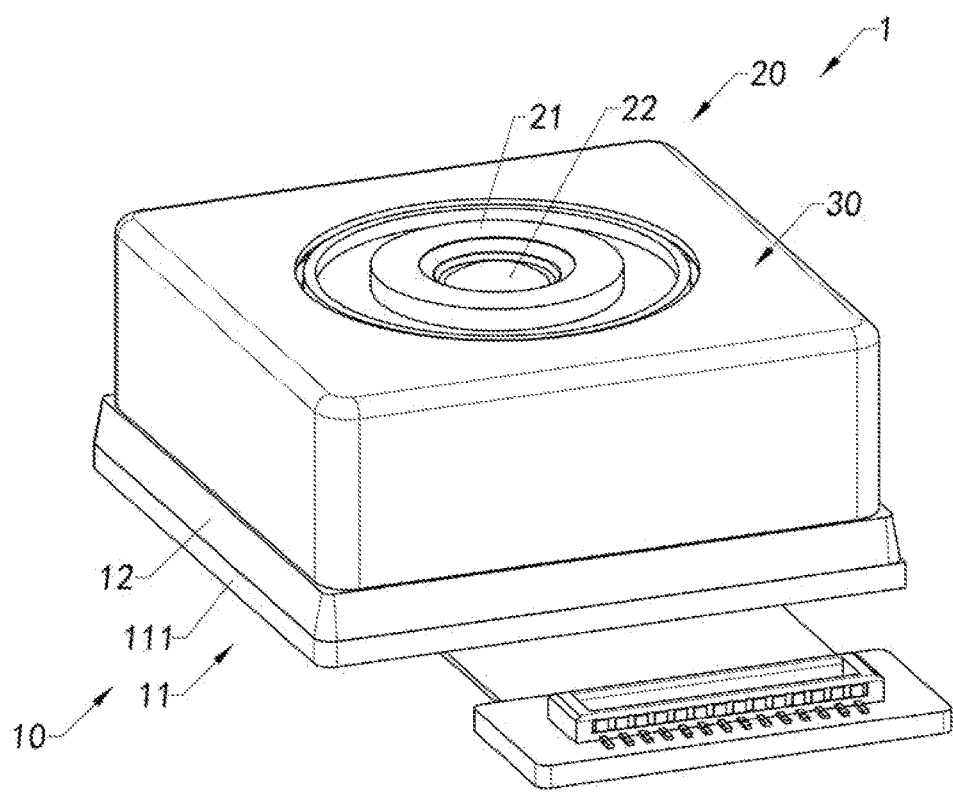
FIG. 2 shows a perspective view of a camera module according to a first embodiment of the present invention.
Figure 3:
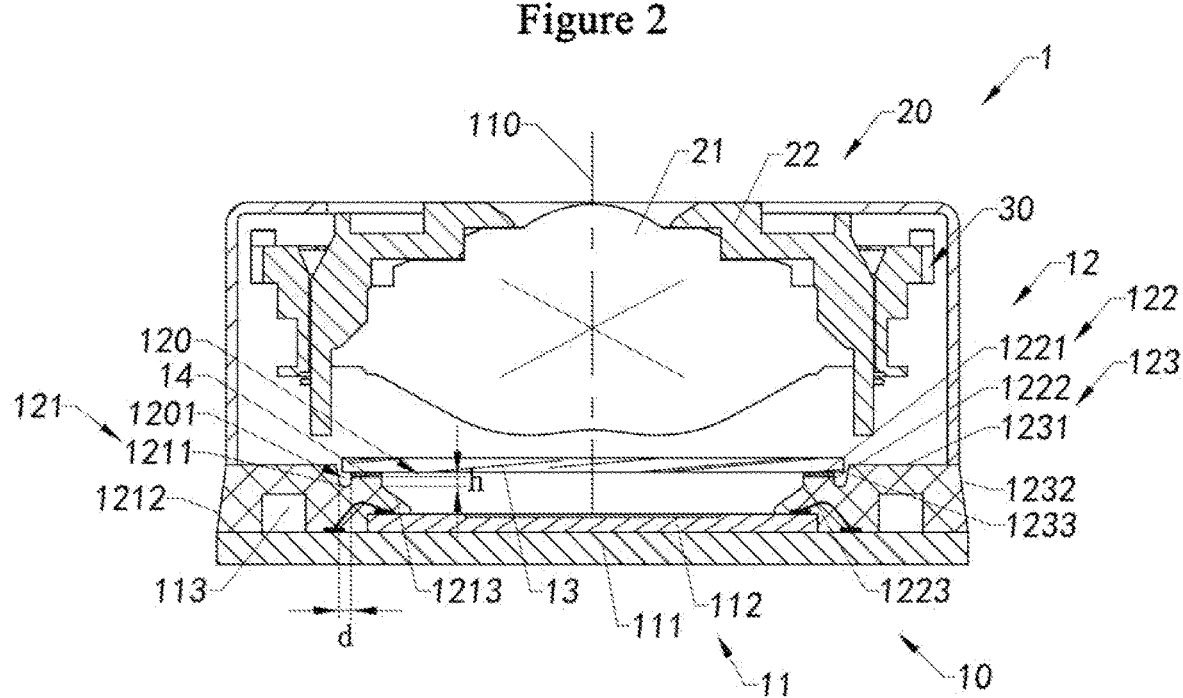
FIG. 3 shows a sectional view of the camera module according to the above first embodiment of the present invention.
Figure 4:
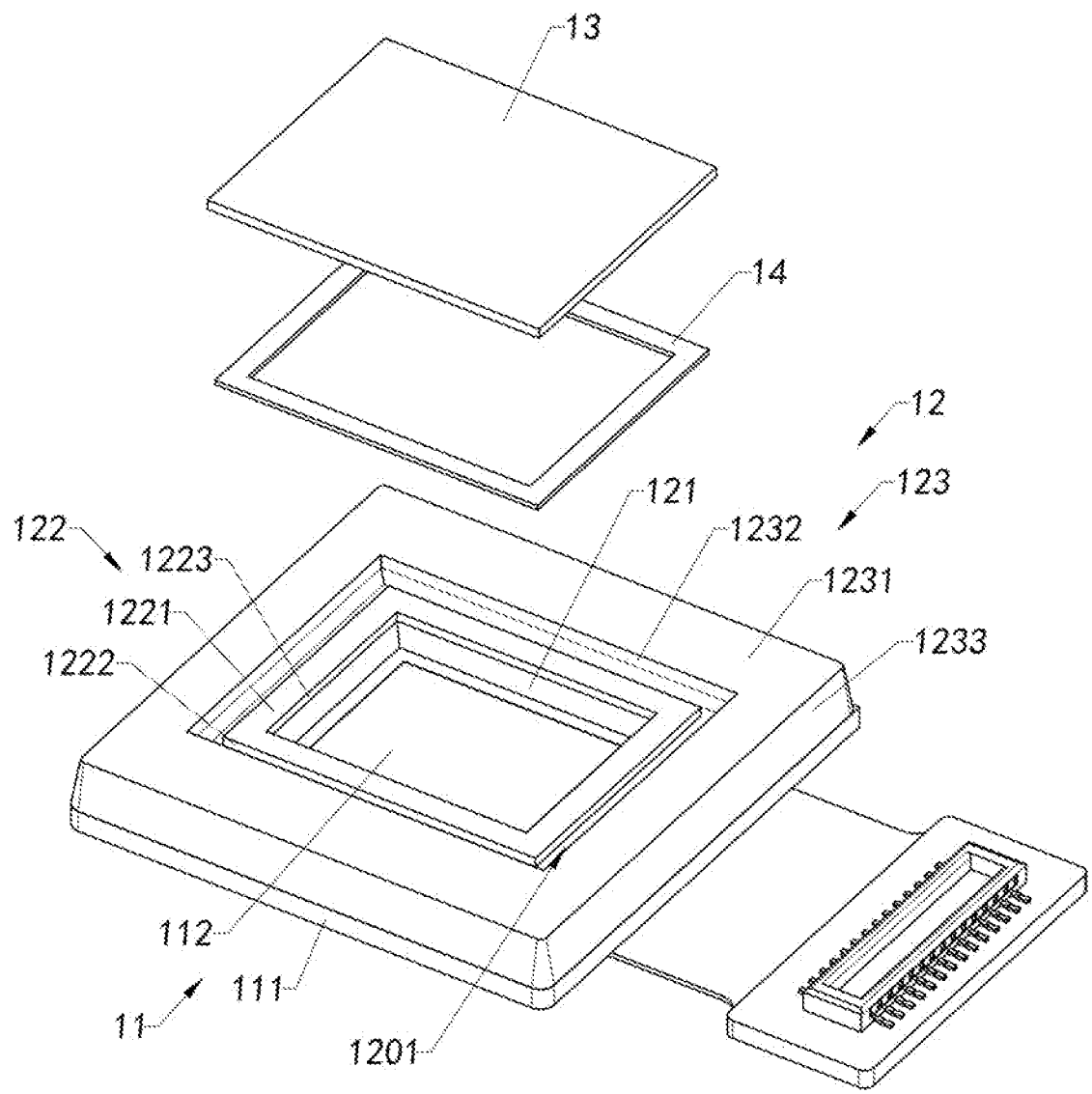
FIG. 4 shows a three-dimensional exploded view of the molded photosensitive assembly of the camera module according to the above first embodiment of the present invention.

It is worth mentioning that, although the camera module including only one optical lens 20 is taken as an example in FIGS. 2-4 and the following description to describe the features and advantages of the camera module of the present invention. Those skilled in the art may understand that, the camera modules disclosed in FIGS. 2-4 and the following description are only examples, which do not constitute a limitation on the content and scope of the present invention. For example, in other examples of the camera module, the number of the optical lenses 20 may also be more than one to form an array camera module.

In particular, as shown in FIG. 3, the molded base 12 of the molded photosensitive assembly 10 includes a first molded portion 121, a second molded portion 122, and a third molded portion 123. The first molded portion 121 embeds a part of the imaging assembly 11. The second molded portion 122 is integrally formed on a first upper surface 1211 of the first molded portion 121, and the second molded portion 122 has a second upper surface 1221, and the second upper surface 1221 of the second molded portion 122 is higher than the first upper surface 1211 of the first molded portion 121, so as to define and form an outer space 1201 by a second outer side surface 1222 of the second molded portion and the first upper surface 1211 of the first molded portion 121, i.e., the molded base 12 provides an attachment surface higher than the first upper surface 1211 for the filter member 13 by the second upper surface 1221 of the second molded portion 122, so as to facilitate attaching the filter member 13 to the second molded portion 122 of the molded base 12. The third molded portion 123 is integrally formed on the first upper surface 1211 of the first molded portion 121, wherein the third molded portion 123 is located at outer side of the second molded portion 122, and the third molded portion 123 and the second molded portion 122 are spaced apart to form an outer space 1201 between the third molded portion 123 and the second molded portion 122.

In other words, in this embodiment of the present invention, the second molded portion 122 and the third molded portion 123 both integrally extend upward from the first upper surface 1211 of the first molded portion 121, so as to form the molded base 12 having an integral structure. That is to say, both of the second molded portion 122 and the third molded portion 123 may be integrally formed on the first upper surface 1211 of the first molded portion 121 by a molding process, so that the entire molded base 12 has an integral structure. It is understandable that, the inside of the first molded portion 121 penetrates up and down to form a light window 120 of the molded base 12, and the second molded portion 122 surrounds the light window 120 of the molded base 12, and the light window 120 of the molded base 12 corresponds to the photosensitive path 110 of the imaging assembly 11.

In this way, even though a transition arc surface is still formed at a junction between a third inner side surface 1233 of the third molded portion 123 and the first upper surface 1211 of the first molded portion 121 due to coating during the molding process, since the second upper surface 1221 of the second molded portion 122 is higher than the transition arc surface on the molded base 12, i.e., the attachment surface of the filter member 13 is higher than the transition arc surface on the molded base 12, when the filter member 13 is attached to the attachment surface of the molded base 12, the edge of the filter member 13 may be in the outer space 1201, without needing to avoid the transition arc surface on the molded base 12, so that the edge of the filter member 13 may be as close as possible to the third inner side surface 1233 of the third molded portion 123, thereby facilitating to increase the attachment area of the filter member 13, i.e., the bottom supporting area of the filter member 13 is enlarged, which facilitates to enhance the connection strength between the filter member 13 and the molded base 12 and improve the reliability of the camera module 1.

Further, as shown in FIG. 3, since the second upper surface 1221 of the second molded portion 122 of the molded base 12 is higher than the first upper surface 1211 of the first molded portion 121, and there is no border between the second upper surface 1221 of the second molded portion 122 and the transition arc surface on the molded base 12, thus the molded base 12 may provide a flat attachment surface for the filter member 13 by the second upper surface 1221 of the second molded portion 122.

Preferably, the second upper surface 1221 of the second molded portion 122 is a flat surface, so that the filter member 13 is attached to the molded base 12 smoothly, so as to ensure that the filter member 13 has good attachment quality. It is worth noting that, due to the size of the mold indenter of the molding process and the consideration of the height of the camera module 1, a height range of the second upper surface 1221 of the second molded portion 122 relative to the first upper surface 1211 of the first molded portion 121 is preferably implemented to be 0.03-0.2 mm, i.e., a height difference h between the second upper surface 1221 of the second molded portion 122 and the first upper surface 1211 of the first molded portion 121 is 0.03-0.2 mm (as shown in FIG. 3). This may not only meet the requirement of the size of the mold indenter of the molding process, but also prevent an installation height of the filter member 13 from being too high, which is caused by an excessive height of the second upper surface 1221 of the second molded portion 122, and it in turn causes the height of the camera module 1 to increase.

In addition, as shown in FIGS. 3-4, the third molded portion 123 of the molded base 12 is located at the outer side of the second molded portion 122, and the third molded portion 123 is spaced apart from the second molded portion 122, so that the outer space 1201 of the molded base 12 is reserved between the third molded portion 123 and the second molded portion 122. In other words, the third inner side surface 1233 of the third molded portion 123 is located at the outer side of the second outer side surface 1222 of the second molded portion 122, i.e., a minimum distance $r_3$ between the third inner side surface 1233 of the third molded portion 123 and the photosensitive path 110 of the imaging assembly 11 is greater than a maximum distance $R_2$ between the second outer side surface 1222 of the second molded portion 122 and the photosensitive path 110 of the imaging assembly 11, i.e., $r_3 > R_2$, so that a groove is formed on the molded base 12 by the height difference of the first upper surface 1211 of the first molded portion 121 and the second upper surface 1221 of the second molded portion 122 relative to the third upper surface 1231 of the third molded portion 123, i.e., the outer space 1201 of the molded base 12 is formed between the third inner side surface 1233 of the third molded portion 123 and the second outer side surface 1222 of the second molded portion 122, so that the edge of the filter member 13 may extend into the outer space 1201 to be close to the third inner side surface 1233 of the third molded portion 123 while attaching the filter member 13, without being affected by the transition arc surface between the third inner side surfaces 1233 of the third molded portion 123 and the first upper surface 1211 of the first molded portion 121.

Preferably, limited by the minimum size of the mold indenter of the molding process, the distance d between the third inner side surface 1233 of the third molded portion 123 and the second outer side surface 1222 of the second molded portion 122 is not less than 0.01 mm (as shown in FIG. 3), i.e., the width of the outer space 1201 of the molded base 12 is not less than 0.01 mm.

Of course, in this embodiment of the present invention, since the inside of the first molded portion 121 penetrates up and down, i.e., the first inner side surface 1213 of the first molded portion 121 defines the light window 120 of the molded base 12. Therefore, as shown in FIG. 3, a minimum distance $r_2$ between the second inner side surface 1223 of the second molded portion 122 and the photosensitive path 110 of the imaging assembly 11 is not less than a maximum distance $r_1$ between the first inner side surface 1213 of the first molded portion 121 and the photosensitive path 110 of the imaging assembly 11, i.e., so as to prevent the second molded portion 122 from blocking the photosensitive path 110 of the imaging assembly 11.

It is worth mentioning that, in the first embodiment of the present invention, as shown in FIGS. 3-4, the imaging assembly 11 includes a circuit board 111 and at least one photosensitive element 112, wherein each photosensitive element 112 is respectively and conductively mounted on different positions of the circuit board 111, and a photosensitive area of each photosensitive assembly 112 corresponds to the corresponding optical lenses 20. In addition, when the filter member 13 is correspondingly attached to the second molded portion 122 of the molded base 12, the filter member 13 corresponds to the photosensitive element 112, and an inner space 100 of the molded photosensitive assembly 10 is formed between the filter member 13 and the photosensitive element 112.

Further, as shown in FIGS. 3-4, the molded photosensitive assembly 10 may further include an adhesive layer 14, wherein the adhesive layer 14 is formed by curing an adhesive, and the adhesive layer 14 is located between a lower surface 131 of the filter member 13 and the second upper surface 1221 of the second molded portion 122, so as to firmly attach the filter member 13 to the molded base 12, so that the filter member 13 corresponds to the photosensitive path 110 of the imaging assembly 11. More particularly, when the filter member 13 is attached to the second molded portion 122 of the molded base 12, the lower surface 131 of the filter member 13 faces downward to face the imaging assembly 11, and the upper surface 132 of the filter member 13 also correspondingly faces upward to face the optical lenses 20.

Since the adhesive for forming the adhesive layer 14 has a certain fluidity before curing, especially when the filter member 13 is attached, the filter member 13 will apply pressure to the adhesive before curing, and thus the adhesive will inevitably overflow before curing; therefore, the presence of the outer space 1201 may also guide the adhesive to overflow outward, which facilitates to reduce the adhesive overflow inward to a certain extent, so as to prevent the adhesive from flowing inward to the first inner side surface 1213 of the first molded portion 121 and the photosensitive element 112 of the imaging assembly 11, thereby facilitating to reduce the risk of affecting the imaging quality of the camera module 1 by the adhesive In other words, since the second upper surface 1221 of the second molded portion 122 of the molded base 12 is higher than the first upper surface 1211 of the first molded portion 121, so that the outer space 1201 of the molded base 12 is located around the second molded portion 122 and serves as an overflow space for accommodating adhesive on the molded base 12; therefore, when the filter member 13 is attached to the second upper surface 1221 of the second molded portion 122 by adhesive, an outer peripheral edge of the second molded portion 122 may be located in the outer space 1201 of the molded base 12, which allows the adhesive to overflow to the outer space 1201 of the molded base 12 before curing (i.e., the outer space 1201 of the molded base 12 may be used as a space of the molded base 12 for accommodating the overflowed adhesive), so as to reduce the amount of the adhesive overflowing inward, thereby facilitating to reduce the risk of affecting the imaging quality of the camera module 1 due to the adhesive overflowing inward into the photosensitive element 112.

It is understandable that for the existing camera module 1P, as shown in FIG. 1, although the groove 35P provided on the molded base 32P may further reduce the distance between the filter 33P and the photosensitive chip 311P, so as to minimize the thickness of the photosensitive assembly 30P, however, after the filter 33P is attached to the groove 35P of the molded base 32P, not only is there no space for the overflowed adhesive around the filter 33P, but also the transition arc surface 351P of the groove 35P of the molded base 32P will inevitably block the adhesive used to bond the filter 33P to overflow outward, causing more adhesive to overflow inward, which may easily cause the adhesive to overflow inward to the photosensitive chip 311P of the imaging assembly 31P, thereby causing contamination of the photosensitive chip 311P, and affecting the imaging quality of the camera module. In the camera module 1 of the above first embodiment of the present invention, the molded base 12 of the molded photosensitive assembly 10 may not only provide a sufficiently large and flat attachment surface, which is used to firmly and smoothly attach the filter member 13 without needing to avoid the transition arc surface; and it may also provide a space for the overflowed adhesive, thereby alleviating the affection of the imaging quality of the camera module due to the inwardly overflowed adhesive before curing.

It is worth noting that, in the above first embodiment of the present invention, the adhesive layer 14 of the molded photosensitive assembly 10 may be, but not limited to, formed by curing adhesive such as thermosetting glue, in other words, the adhesive for forming the adhesive layer 14 may be, but is not limited to, implemented as glue such as thermosetting glue or the like. Of course, in other examples of the present invention, the adhesive for forming the adhesive layer 14 may also be implemented as other types of adhesive materials such as light-curable glue, as long as the adhesive layer 14 may be formed to attach the filter member 13 firmly to the second upper surface 1221 of the second molded portion 122, which is not repeated herein.

According to the above first embodiment of the present invention, as shown in FIG. 3, the imaging assembly 11 of the molded photosensitive assembly 10 according to the present invention usually also includes a group of electronic components 113, wherein each of the electronic components 113 may be mounted on an edge area of the circuit board 111 at intervals by a process such as SMT (Surface Mount Technology), and each of the electronic components 113 may be conductively connected to the circuit board 111. It should be understood that, each of the electronic components 113 may be respectively located on the periphery of the photosensitive element 112, or may be respectively located on the same side or opposite sides of the photosensitive element 112. For example, in a specific example, all of the electronic components 113 may be divided into two rows, and are symmetrically arranged on both sides of the photosensitive element 112.

However, due to the minimum thickness of the molding process, too small a molding thickness will cause difficulty in molding and imaging. Therefore, in order to ensure that the molded base 12 may completely embed the electronic components 113, the third molded portion 123 of the molded base 12 preferably corresponds to the electronic components 113 of the imaging assembly 11; and the third upper surface 1231 of the third molded portion 123 is higher than the top surface of the electronic components and corresponds to the electronic components 113 of the imaging assembly 11, so as to ensure that the top of the electronic components 113 has a sufficient molding thickness by the third molded portion 123.

In other words, as shown in FIGS. 3-4, the third molded portion 123 is integrally molded on the first upper surface 1211 of the first molded portion 121, so that the third upper surface 1231 of the third molded portion 123 is higher than the first upper surface 1211 of the first molded portion 121. In addition, since the third molded portion 123 corresponds to the electronic components 113 of the imaging assembly 11, the first upper surface 1211 of the first molded portion 121 may not necessarily be higher than the top surface of the electronic component 113, so as to completely embed the electronic components 113 by the third molded portion 123 and the first molded portion 121. It is understandable that, the molded base 12 embeds each of the electronic components 113 after molding, so that the molded base 12 isolates the adjacent electronic components 113 and isolates the electronic components 113 and the photosensitive element 112, and the adjacent electronic components 113 will not interfere with each other, even when a distance between the adjacent electronic components 113 is relatively short, it mays still ensure the imaging quality of the camera module 1. In this way, larger number of the electronic components 113 may be mounted on the circuit board 111 with small area, so that the structure of the molded photosensitive assembly 10 is more compact, which facilitates to improve the imaging quality of the camera module 1 on the basis of controlling the size of the camera module 1.

It is worth noting that, since the first upper surface 1211 of the first molded portion 121 may be lower than the top surface of the electronic components 113, so that the second upper surface 1221 of the second molded portion 122 may not be affected by the size of the electronic components 113, i.e., the second upper surface 1221 of the second molded portion 122 may also be lower than the top surface of the electronic components 113, so that the second upper surface 1221 of the second molded portion 122 may also be lowered, and the attachment height of the filter member 13 may be reduced, which facilitates to shorten the distance between the filter member 13 and the photosensitive elements 112 of the imaging assembly 11, thereby reducing the back focus of the camera module 1, and facilitating to reduce the height of the camera module 1.

It is worth mentioning that, in this first embodiment of the present invention, the filter member 13 includes at least one filter member, wherein each of the filter members is respectively and correspondingly disposed on the photosensitive element 112 of the imaging assembly 11, so as to respectively form each of the internal spaces 100 between each of the filter members and the photosensitive element 112. In addition, the filter member is located between the optical lenses 20 and the photosensitive element 112, so that the light entering the inside of camera module 1 from the optical lenses 20 may be received by the photosensitive area of the photosensitive element 112 and subject to photoelectric conversion only after being filtered by the filter member, thereby improving the imaging quality of the camera module. For example, the filter member may filter the infrared part of the light entering the inside of the camera module 1 from the optical lenses 20. Of course, in other examples of the present invention, the filter member 13 may also include an attachment frame (not shown in the figure), wherein the attachment frame is located at the edge of the filter member, so as to prevent the filter member from directly contacting the adhesive layer 14 through the attachment frame, and prevent the filter member from being contaminated or corroded by the adhesive layer 14, thereby effectively prolonging the service life of the filter member. It is understandable that, in different examples of the camera module 1, the filter member may be implemented in different types, for example, the filter member may be implemented as an infrared cut-off filter, a full transmission spectrum filter, and other filters or a combination of multiple filters.

In addition, according to the above first embodiment of the present invention, referring to FIGS. 2-3, the camera module 1 may further include at least one driver 30, wherein each of the optical lenses 20 is respectively assembled in each of the drivers 30, and each of the drivers 30 is respectively assembled to the third upper surface 1231 of the third molded portion 123 of the molded base 12, so that each of the optical lenses 10 is held separately in the photosensitive path 110 of the imaging assembly 11 of the molded photosensitive assembly 10, so as to be assembled into a zoom camera module. In addition, when the camera module 1 is used, the driver 30 may drive the optical lenses 20 to move back and forth along the photosensitive path 110 of the imaging assembly 11, so as to adjust the focal length of the camera module 1 by adjusting the distance between the optical lenses 20 and the photosensitive element 112. The type of the driver 30 of the camera module of the present invention is not limited. The driver 30 may be implemented as a voice coil motor, which may be conductively connected to the circuit board 111, so as to be in an operating state after receiving power and control signal, thereby driving the optical lenses 20 to move back and forth along the photosensitive path 110 of the imaging assembly 11. Nevertheless, those skilled in the art may understand that the type of the driver 30 is not limited, as long as it may drive the optical lenses 20 to move back and forth along the photosensitive path 110 of the imaging assembly 11.

Particularly, as shown in FIGS. 2-3, the optical lenses 20 of the camera module 1 includes a lens barrel 21 and a lens group 22, wherein the lens barrel 21 is assembled into the driver 30, and the lens group 22 is assembled into the lens barrel 21, wherein the driver 30 is disposed on the third upper surface 1231 of the third molded portion 123 of the molded base 12, so that the lens group 22 of the optical lenses 20 is held in the photosensitive path 110 of the imaging assembly 11 of the molded photosensitive assembly 10 by the driver 30.

It is understandable that, in other examples of the present invention, the camera module 1 may not include any driver 30. In other words, the lens barrel 21 of the optical lenses 20 is directly assembled on the third upper surface 1231 of the third molded portion 123 of the molded base 12, wherein the lens group 22 is assembled into the lens barrel 21, so that the lens group 22 of the optical lenses 20 may be held in the photosensitive path 110 of the imaging assembly 11 of the molded photosensitive unit 10 by the lens barrel 21. Of course, in another example of the present invention, the lens barrel 21 of the optical lenses 20 may also be integrally cured and formed together with the third molded portion 123 of the molded base 12 through a molding process by molding materials, thereby enhancing the stability and reliability of the camera module 1, which will not be repeated herein.

Figure 5A:
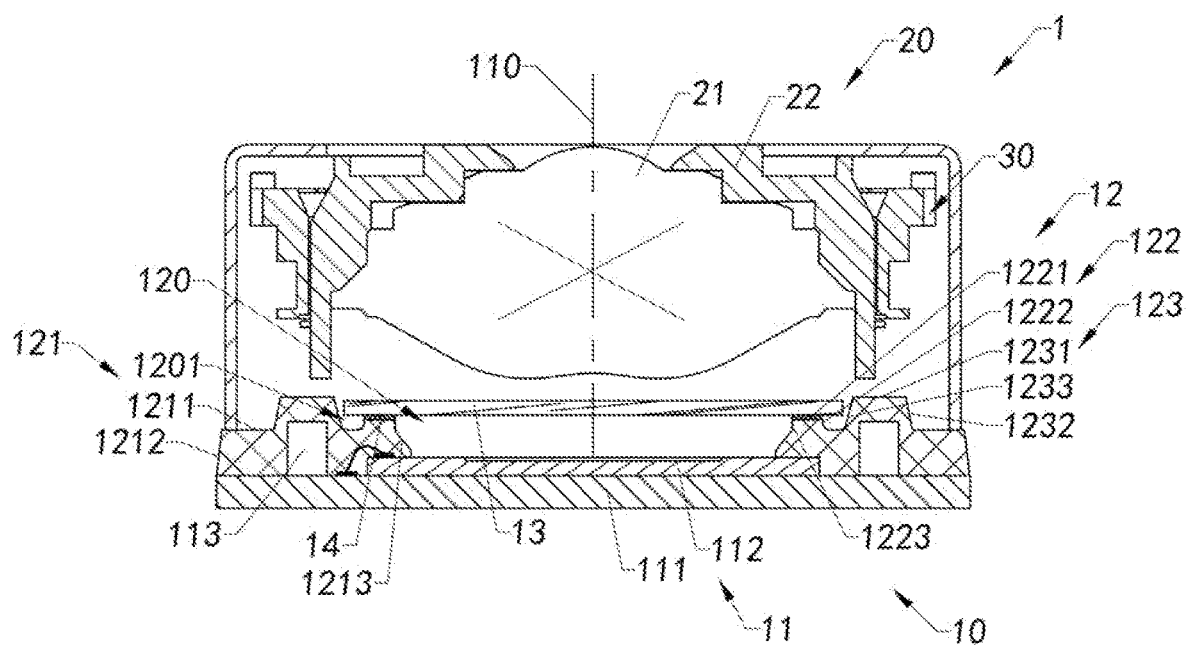
FIGS. 5A and 5B show a first modified implementation of the camera module according to the above first embodiment of the present invention.
Figure 5B:
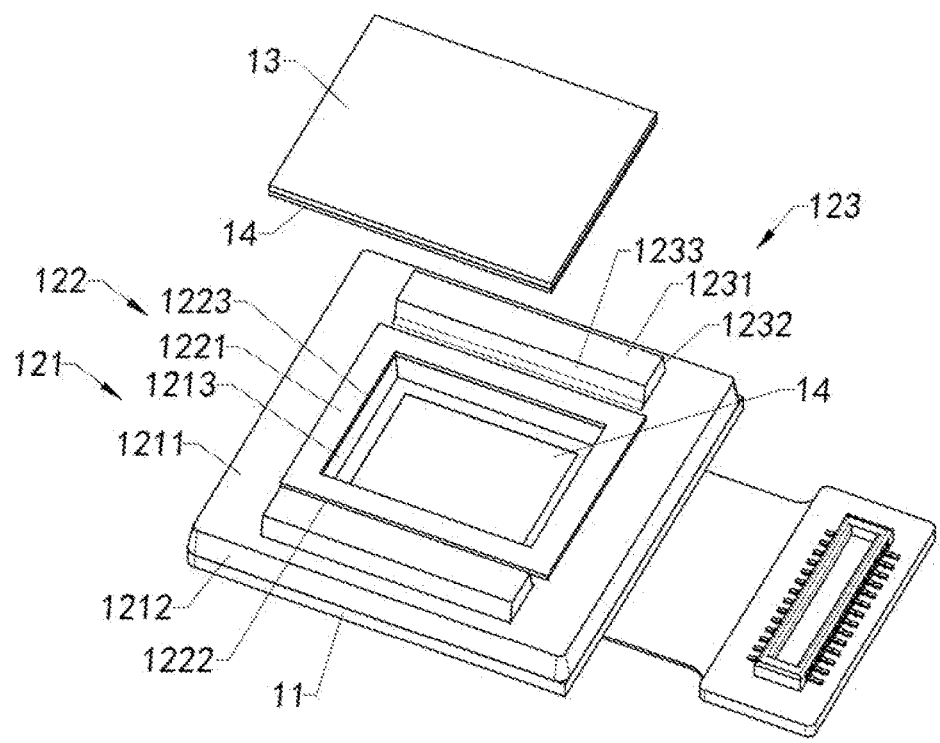

FIGS. 5A and 5B show a first modified implementation of the camera module 1 according to the above first embodiment of the present invention. Particularly, compared with the above first embodiment according to the present invention, the difference of the camera module 1 according to the first modified implementation of the present invention is in that: a third outer side surface 1232 of the third molded portion 123 of the molded base 12 is located at inner side of the first outer side surface 1221 of the first molded portion 121, i.e., a maximum distance $R_3$ between the third outer side surface 1232 of the third molded portion 123 and the photosensitive path 110 of the imaging assembly 11 is less than the minimum distance $R_1$ between the first outer side surface 1221 of the first molded portion 121 and the photosensitive path 110 of the imaging assembly 11, i.e., $R_3<R_1$, so as to reserve installation space for the driver 30 on the first upper surface 1211 of the first molded portion 121 and the outer side of the third molded portion 123, so that the driver 30 is correspondingly mounted on the first upper surface 1211 of the first molded portion 121, thereby facilitating to reduce the overall height of the camera module 1.

In other words, as shown in FIG. 5A, the third outer side surface 1232 of the third molded portion 123 of the molded base 12 is located at inner side of the first outer side surface 1221 of the first molded portion 121, so that the driver 30 may be directly mounted on the first upper surface 1211 of the first molded portion 121 of the molded base 12. Since the first upper surface 1211 of the first molded portion 121 is lower than the third upper surface 1231 of the third molded portion 123, the installation height of the driver 30 may be reduced, thereby facilitating to reduce the overall height of the camera module 1.

It is worth mentioning that, in this modified implementation of the present invention, since the third molded portion 123 only needs to embed the top of the electronic components 113, i.e., the position of the third molded portion 123 only needs to correspond to the electronic components 113 of the imaging assembly 11. Therefore, the third molded portion 123 does not need to have a ring structure, and the position and size of the third molded portion 123 may be designed according to the position and size of the electronic components 113. For example, as shown in FIG. 5B, when all the electronic components 113 are located only outside the long side of the filter member 13, the third molded portion 123 may be implemented to be located on the two strip-shaped protrusions outside the long side of the filter member 13, so as to cover all the electronic components 113 by the strip-shaped protrusions, and the third molded portion 123 is not provided outside the short side of the filter member 13, thereby reducing the weight of the molded base 12.

Preferably, as shown in FIG. 5A, the height of the third molded portion 123 is greater than that of the second molded portion 122, i.e., the third upper surface 1231 of the third molded portion 123 is higher than the second upper surface 1221 of the second molded portion 122, so that the third molded portion 123 is easier to be formed. In particular, compared to the existing camera module as shown in FIG. 1, although there is still a transition arc surface at the junction of the third inner side surface 1233 of the third molded portion 123 and the first upper surface 1211 of the first molded portion 121, the second upper surface 1221 of the second molded portion 122 is higher than the first upper surface 1211 of the first molded portion 121 (i.e., the second upper surface 1221 of the second molded portion 122 is located above the transition arc surface); in this way, when the filter member 13 is attached on the second upper surface 1221 of the second molded portion 122, the edge of the filter member 13 does not need to avoid the transition arc surface, so that the edge of the filter member 13 may be closer to the third molded portion 123 to maximize the bottom supporting area of the filter member 13, thereby facilitating to improve the reliability of the camera module 1.

More preferably, as shown in FIG. 5A, the third upper surface 1231 of the third molded portion 123 is higher than the upper surface 132 of the filter member 13, and the third upper surface 1231 of the third molded portion 123 corresponds to the optical lenses 20, so that the minimum distance between the third upper surface 1231 of the third molded portion 123 and the optical lenses 20 is smaller than the minimum distance between the upper surface 132 of the filter member 13 and the optical lenses 20. In this way, during the focusing or focus adjusting process of the camera module 1, when the optical lenses 20 is driven by the driver 30 to approach the photosensitive element 112 of the imaging assembly 11, the third molded portion 123 may also block the optical lenses 20 from contacting the filter member 13, so as to prevent the optical lenses 20 from colliding with the filter member 13, thereby effectively protecting the filter member 13 and the optical lenses 20 from damage.

Most preferably, as shown in FIG. 5A, the third upper surface 1231 of the third molded portion 123 only corresponds to the lens barrel 22 of the optical lenses 20, so that when the optical lenses 20 is driven by the driver 30 to approach the photosensitive element 112 of the imaging assembly 11, the third molded portion 123 may only contact the lens barrel 22 of the optical lenses 20 to prevent the optical lenses 20 from contacting the filter member 13, thereby preventing the third molded portion 123 from colliding with the lens group 21 of the optical lenses 20, and facilitating to protect the lens group 21 of the optical lenses 20.

Figure 6:
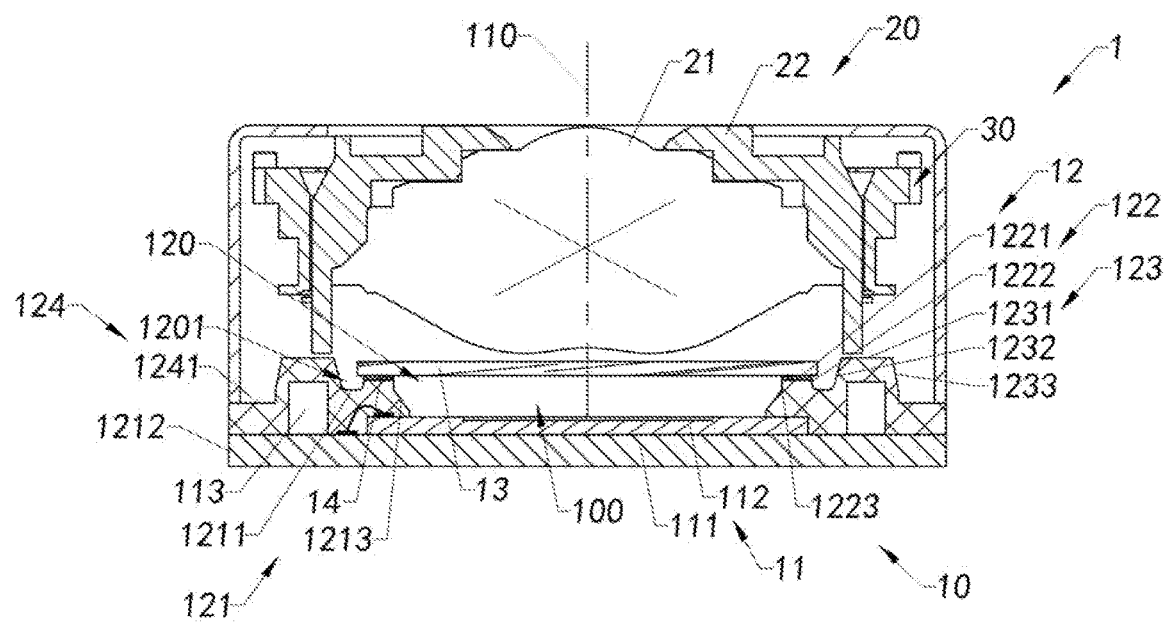
FIG. 6 shows a second modified implementation of the camera module according to the above first embodiment of the present invention.

FIG. 6 shows a second modified implementation of the camera module 1 according to the above first modified implementation of the present invention. Particularly, compared with the above first embodiment of the present invention, the difference of the camera module 1 according to the second modified implementation of the present invention is in that: the molded base 12 of the molded photosensitive assembly 10 may further include a fourth molded portion 124, wherein the fourth molded portion 124 is recessed downward from the first upper surface 1211 of the first molded portion 121, and the fourth molded portion 124 is located at outer side of the third molded portion 123 to form a peripheral groove on the outer periphery of the first molded portion 121, so that the bottom surface of the peripheral groove serves as the fourth upper surface 1241 of the fourth molded portion 124 to provide a mounting surface for the driver 30 (or the optical lenses 20) through the fourth upper surface 1241 of the fourth molded portion 124, and thus the driver 30 (or the optical lenses 20) may be mounted on the fourth upper surface 1241 of the fourth molded portion 124.

In other words, the fourth upper surface 1241 of the fourth molded portion 124 is lower than the first upper surface 1211 of the first molded portion 121, which facilitates to further reduce the installation height of the driver 30, thereby further reducing the overall height of the camera module 1. In particular, in this second modified implementation of the present invention, the fourth molded portion 124 is located on the outer peripheral edge of the first molded portion 121, so that the upper surface 1241 of the fourth molded portion 124 may be substantially lower than the top surface of the electronic components 113, which facilitates to minimize the installation height of the driver 30 and minimize the height of the camera module 1.

Preferably, as shown in FIG. 6, the fourth upper surface 1241 of the fourth molded portion 124 matches the end surface of the driver 30, so that when the driver 30 is disposed on the fourth upper surface 1241 of the fourth molded portion 124, the outer peripheral surface of the driver 30 is flush with the first outer side surface 1221 of the first molded portion 121 of the molded base 12, which facilitates to minimize the size of the camera module 1 and is also beneficial to beautify the appearance of the camera module 1.

Figure 7:
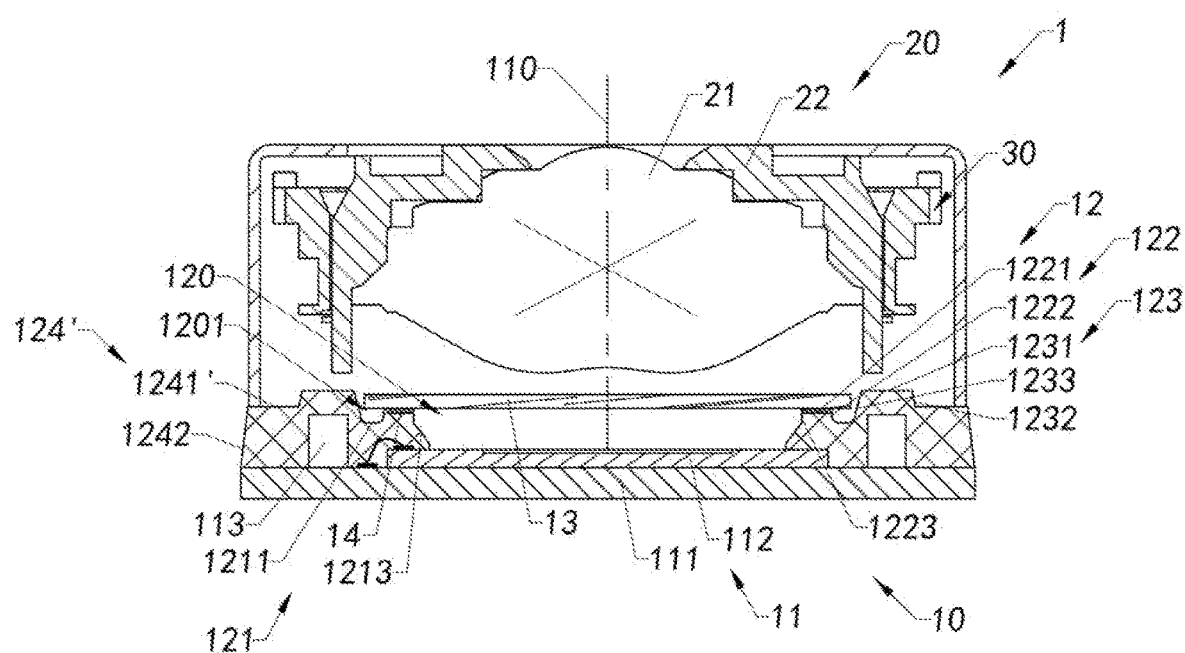
FIG. 7 shows a third modified implementation of the camera module according to the above first embodiment of the present invention.

FIG. 7 shows a third modified implementation of the camera module 1 according to the above first modified implementation of the present invention. Particularly, compared with the above first embodiment of the present invention, the difference of the camera module 1 according to the third modified implementation of the present invention is in that: the molded base 12 of the molded photosensitive assembly 10 may further include a fourth molded portion 124', wherein the fourth molded portion 124' extends upward from the first upper surface 1211 of the first molded portion 121, and the fourth molded portion 124' is located at outer side of the third molded portion 123 to form a peripheral protrusion on the outer peripheral edge of the first molded portion 121, so as to provide a mounting surface for the driver 30 (or the optical lenses 20) through the fourth upper surface 1241' of the fourth molded portion 124', thereby meeting the installation requirements for the driver 30. In other words, due to the installation requirements of the driver 30 and the optical lenses 20, the height of the fourth upper surface 1241' of the fourth molded portion 124' needs to be designed according to the installation requirements of the driver 30, so that the driver 30 is adaptively mounted on the fourth upper surface 1241' of the fourth molded portion 124'. For example, the fourth upper surface 1241' of the fourth molded portion 124' may be higher than the first upper surface 1211 of the first molded portion 121, and lower than the third upper surface 1231 of the third molded portion 123. Of course, in other examples of the present invention, the fourth upper surface 1241' of the fourth molded portion 124' may also be higher than the third upper surface 1231 of the third molded portion 123, thereby meeting the installation requirements of the driver 30.

Figure 8:
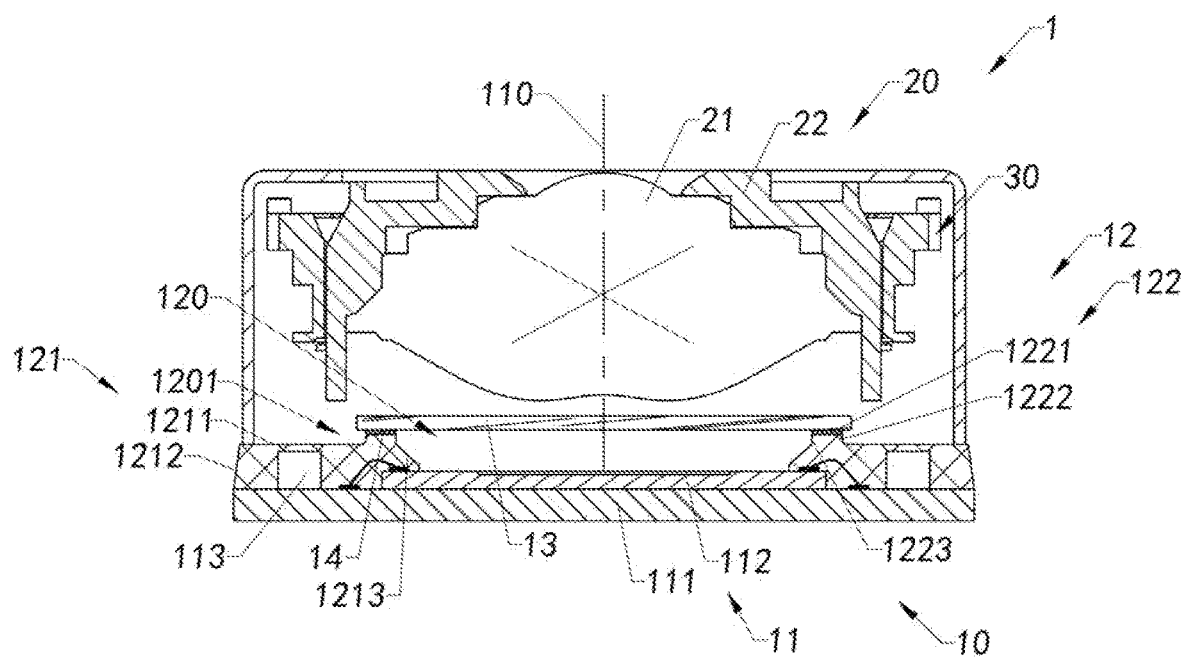
FIG. 8 shows a fourth modified implementation of the camera module according to the above first embodiment of the present invention.

FIG. 8 shows a fourth modified implementation of the camera module 1 according to the above first embodiment of the present invention. Particularly, compared with the above first embodiment according to the present invention, the difference of the camera module 1 according to the fourth modified implementation of the present invention is in that: the molded base 12 of the molded photosensitive assembly 10 does not include the third molded portion 123, wherein the first upper surface 1211 of the first molded portion 121 of the molded base 12 is higher than the top surface of the electronic components 13 of the imaging assembly 11, so that the components 113 are completely embedded by the first molded portion 121, wherein the driver 30 is directly mounted on the first upper surface 1211 of the first molded portion 121.

In addition, as shown in FIG. 8, the second outer side surface 1222 of the second molded portion 122 is located at inner side of the first outer side surface 1221 of the first molded portion 121, i.e., a maximum distance $R_2$ between the second outer side surface 1222 of the second molded portion 122 and the photosensitive path 110 of the imaging assembly 11 is smaller than a minimum distance $R_1$ between the first outer side surface 1221 of the first molded portion 121 and the photosensitive path 110 of the imaging assembly 11, i.e., $R_2<R_1$, so that an outer stepped structure is formed on the molded base 12 through the first molded portion 121 and the second molded portion 122. In this way, the outer space 1201 of the molded base 12 will be formed at the outer stepped structure of the molded base 12, i.e., the outer side surface 1222 of the second molded portion 122 and the first upper surface 1211 of the first molded portion 121 will define and form the outer space 1201 of the molded base 12, so that when the filter member 13 is attached on the second upper surface 1221 of the second molded portion 122, the adhesive may overflow to the outer space 1201 of the molded base 12 (as the space for the overflowed glue of the molded base 12) before curing, thereby reducing the risk of affecting the imaging quality of the camera module 1 due to inwardly overflowing of the adhesive to the photosensitive element 112.

Figure 9:
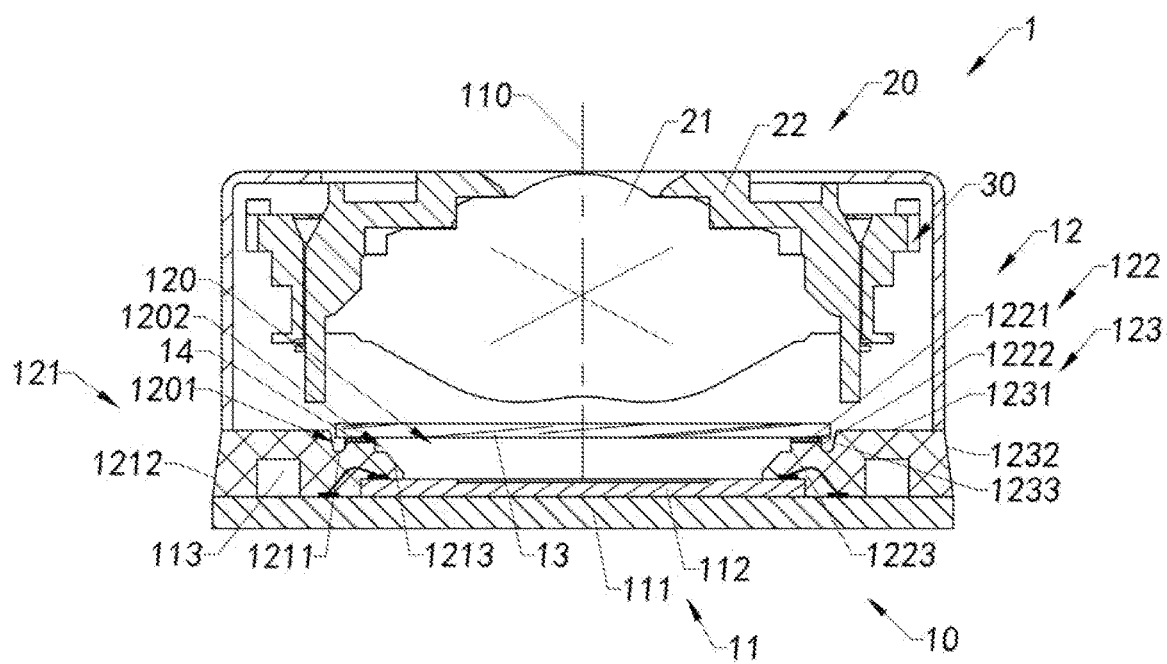
FIG. 9 shows a fifth modified implementation of the camera module according to the above first embodiment of the present invention.

FIG. 9 shows a fifth modified implementation of the camera module 1 according to the above first embodiment of the present invention. Particularly, compared with the above fourth modified implementation of the present invention, the difference of the camera module 1 according to the fifth modified implementation of the present invention is in that: the second inner side surface 1223 of the second molded portion 122 of the molded base 12 of the molded photosensitive assembly 10 is located at outer side of the first inner side surface 1213 of the first molded portion 121, i.e., the minimum distance $r_2$ between the second inner side surface 1223 of the second molded portion 122 and the photosensitive path 110 of the imaging assembly 11 is greater than the maximum distance $r_1$ between the first inner side surface 1213 of the first molded portion 121 and the photosensitive path 110 of the imaging assembly 11, i.e., $r_2 > r_1$, so that an inner space 1202 of the molded base 12 is formed by the second inner side surface 1223 of the second molded portion 122 and the first upper surface 1211 of the first molded portion 121, wherein the inner space 1202 is located inside the second molded portion 122 (as an inwardly overflowed glue space of the molded base 12), so as to store the adhesive overflowing inward from the second upper surface 1221 of the second molded portion 122 and prevent the adhesive from overflowing inward to the photosensitive area of the photosensitive element 112, thereby facilitating to ensure the imaging quality of the camera module 1.

It is worth mentioning that, since after the filter member 13 is adhesively attached to the second upper surface 1221 of the second molded portion 122 through the adhesive layer 14, the filter member 13 will seal the light window 120 of the molded base 12, thus the internal space 100 between the filter member 13 and the photosensitive element 112 of the imaging assembly 11 will form a closed space. When the adhesive for forming the adhesive layer 14 is a thermosetting glue, after applying a circle of the thermosetting glue between the filter member 13 and the second upper surfaces 1221 of the second molded portion 122 of the molded base 12, the thermosetting glue needs to be heated or baked to completely cure the thermosetting glue to form the adhesive layer 14 having a ring structure. In this way, when the thermosetting glue is heated, the gas in the enclosed space between the filter member 13 and the imaging assembly 11 will be thermally expanded, and the filter member 13 will be applied outward force, which may cause deviation or warping of the filter member 13, and in severe cases may also cause the filter member 13 to rupture. At the same time, the expansion of the gas in the enclosed space will also exert pressure on the photosensitive element 112, which may also cause damage to the photosensitive element 112, and cause difficulty in the assembly of the camera module 1, thereby greatly reducing the reliability of the camera module 1.

Therefore, in order to solve the above problems, a second embodiment according to the present invention provides a camera module and a molded photosensitive assembly. Particularly, as shown in FIGS. 10A and 10B, compared with the above first embodiment according to the present invention, the difference of the camera module 1 of the second embodiment according to the present invention is in that: the second molded portion 122 of the molded base 12 of the molded photosensitive assembly 10 is provided with at least one notch 1224, so that when the filter member 13 is attached on the second upper surface 1221 of the second molded portion 122, an air escape hole 1203 of the module base 12 is formed at the notch 1224 of the second molded portion 122, so that the internal space 100 of the molded photosensitive assembly 10 may be communicated to the outside of the molded photosensitive assembly 10 through the air escape hole 1203, so that the internal space 100 of the molded photosensitive assembly 10 forms an unclosed space.

In this way, when the adhesive is heated to cure, the gas in the internal space 100 of the molded photosensitive assembly 10 may escape through the air escape hole 1203, so that the air pressure in the internal space 100 of the molded photosensitive assembly 10 is kept constant (equal to atmospheric pressure) to avoid applying force to the filter member 13 and the photosensitive element 112, thereby prevent the filter member 13 and the photosensitive element 112 from being damaged by gas expansion. Of course, after the adhesive is heated and cured, the gas in the internal space 100 of the molded photosensitive assembly 10 will be reduced in volume due to cooling; at this time, the gas outside the molded photosensitive assembly 10 may enter the internal space 100 of the molded photosensitive assembly 10 through the air escape hole 1203 to keep the air pressure in the internal space 100 constant, thereby preventing the filter member 13 and the photosensitive element 112 from being damaged due to heating and cooling.

It should be understood that, in the existing camera module 1P shown in FIG. 1, since the filter 33P is directly attached to the groove 35P of the molded base 32P, it is extremely difficult to provide a notch on the molded base 32P to form an air escape hole, which makes it difficult for the internal space of the molded photosensitive assembly 3P to form a non-closed space. However, in the camera module 1 of the present invention, since the second molded portion 122 extends upward from the first molded portion 121 to form a protrusion on the first upper surface 1211 of the first molded portion 121, so that the second molded portion 122 may be easily provided with the notch. Therefore, the second molded portion 122 may not only provide a flat attachment surface for the filter member 13, but also provide convenient conditions for forming the air escape hole 1203 on the molded base 12.

Figure 10A:
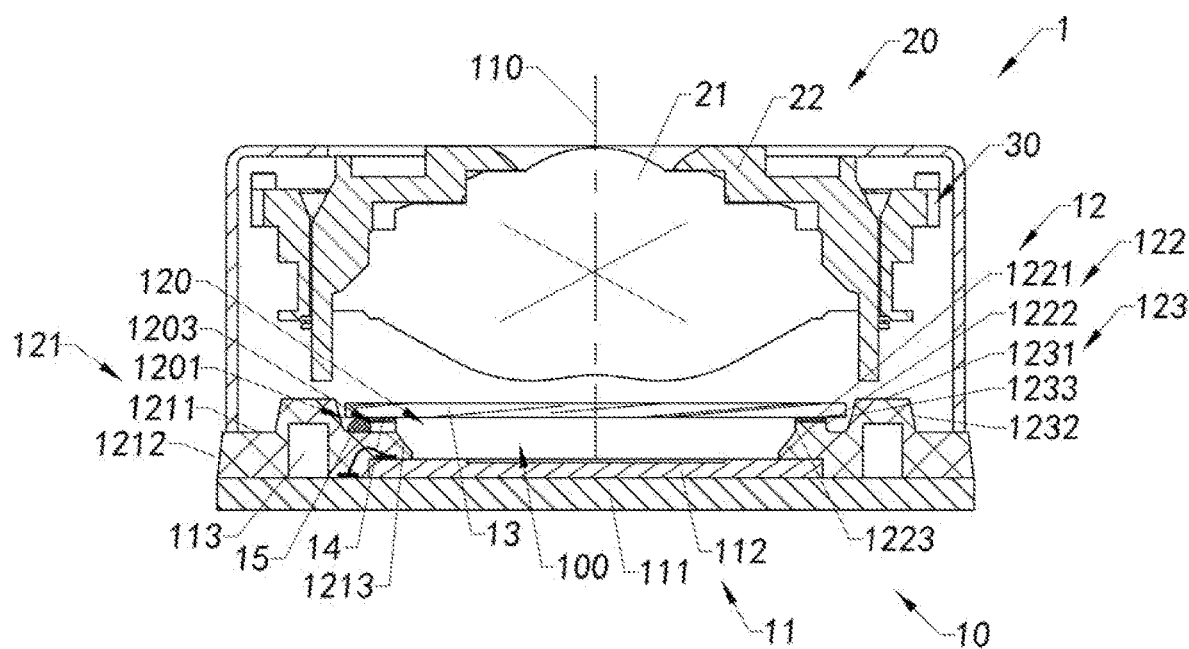
FIG. 10A is a sectional view of a camera module according to a second embodiment of the present invention.
Figure 10B:
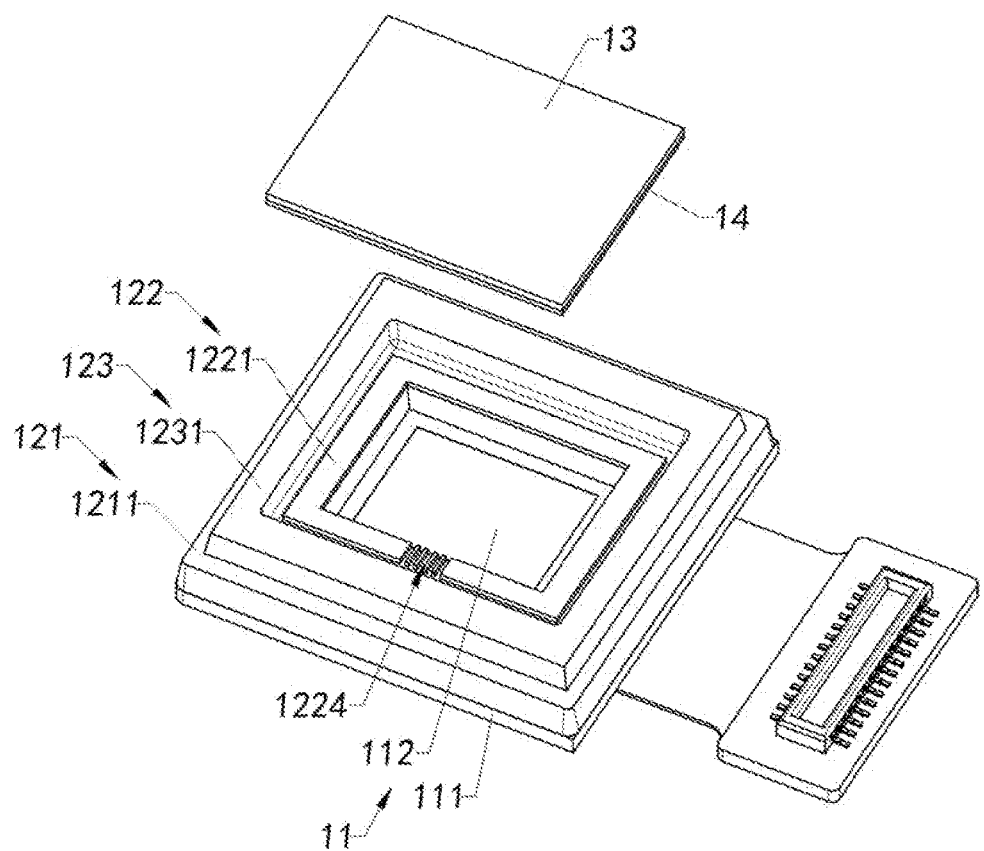
FIG. 10B shows a three-dimensional exploded view of the molded photosensitive assembly of the camera module according to the above second embodiment of the present invention.

Further, as shown in FIGS. 10A and 10B, the notch 1224 of the second molded portion 122 extends laterally from the second inner side surface 1223 of the second molded portion 122 to the second outer side surface 1222 of the second molded portion 122, so as to form a lateral notch in the second molded portion 122. In this way, when the filter member 13 is adhered to the second upper surface 1221 of the second molded portion 122 through the adhesive layer 14, the notch 1224 of the second molded portion 122 will form a laterally arranged air escape hole 1203, so as to increase the difficulty of dust entering the inner space 100 of the molded photosensitive assembly 10 through the air escape hole 1203, thereby facilitating to ensure the working performance of the camera module 1.

Preferably, as shown in FIG. 10A, the notch 1224 of the second molded portion 122 corresponds to the long side of the filter member 13, so that there are the longer adhesive layer 14 at both sides of the notch 1224 for bonding the filter member 13, so as to enhance the bonding strength between the filter member 13 and the second molded portion 122. Of course, in other examples of the present invention, the notch 1224 of the second molded portion 122 may also be located at other part of the filter member 13, as long as the air escape hole 1203 communicating the internal space 100 of the molded photosensitive assembly 10 with the outside of the molded photosensitive assembly 10 may be formed, which will not be repeated herein.

More preferably, as shown in FIG. 10A, after the adhesive is cured to form the adhesive layer 14, adhesive may be applied again at the notch 1224 of the second molded portion 122 to form a reinforcement adhesive piece 15 after the adhesive is cured, so as to enhance the bonding strength between the filter member 13 and the second molded portion 122 at the notch 1224 through the reinforcement adhesive piece 15, thereby ensuring that the filter member 13 is firmly attached to the second molded portion 122. In other words, an adhesive may also be applied at the air escape hole 1203 of the molded base 12, so as to form the reinforcement adhesive piece 15 for enhancing the bonding strength between the filter member 13 and the second molded portion 122. In addition, the reinforcement adhesive piece 15 may also block the air escape hole 1203 to prevent external dust from entering the internal space 100 of the molded photosensitive assembly 10 through the air escape hole 1203, thereby facilitating to ensure the imaging quality of the camera module 1. It is understandable that, although the reinforcement adhesive piece 15 will block the air escape hole 1203, the filter member 13 has been firmly attached to the molded base 12 by the adhesive layer 14; in addition, the temperature change in the subsequent assembly and usage process is small, so that the air pressure change in the internal space 100 of the molded photosensitive assembly 10 is also small, and thus the temperature change is not enough to substantively affect the filter member 13.

Figure 11A:
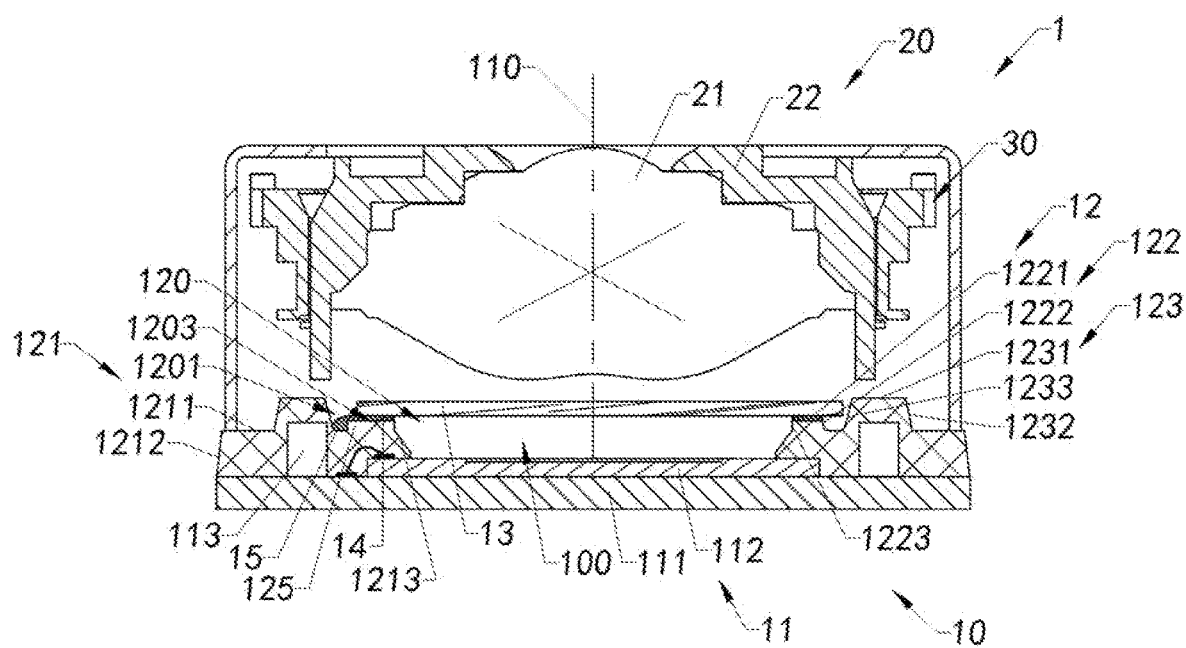
FIGS. 11A and 11B show a modified implementation of the camera module according to the above second embodiment of the present invention.
Figure 11B:
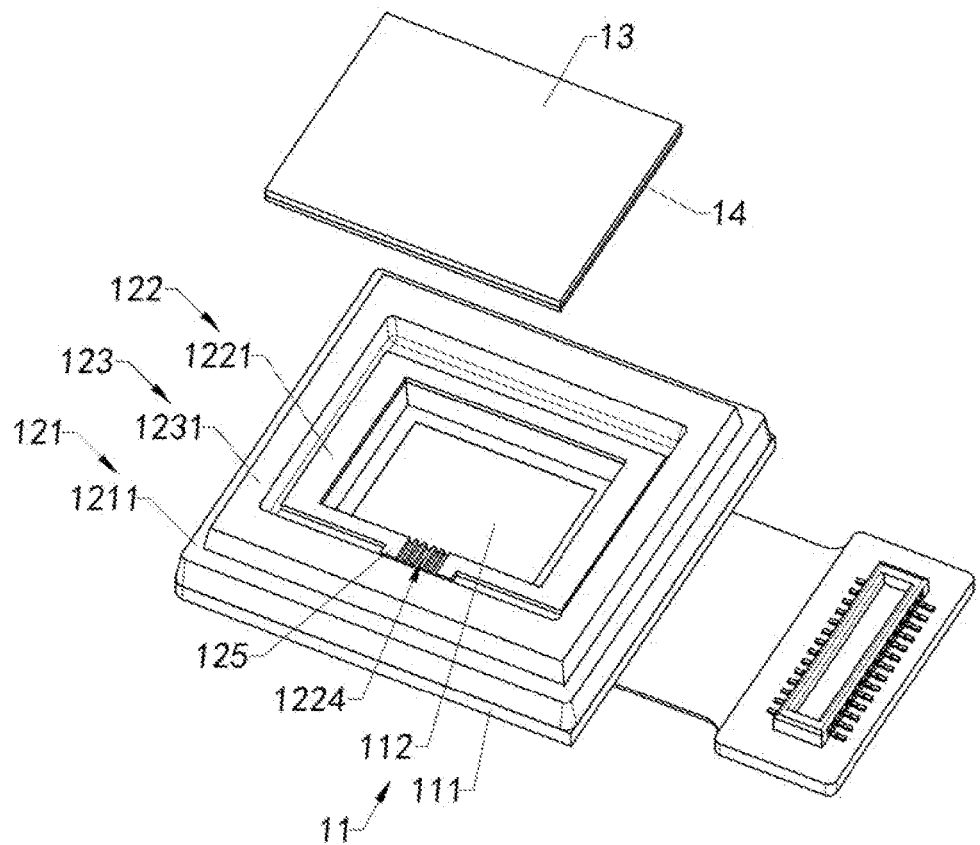

FIGS. 11A and 11B show a modified implementation of the camera module 1 according to the second embodiment of the present invention, wherein the molded base 12 of the molded photosensitive assembly 10 may further include a molded reinforcement portion 125, wherein the molded reinforcement portion 125 integrally extends outward from the second outer side surface 1222 of the second molded portion 122 at the notch 1224 of the second molded portion 122, so that a bonding area of the adhesive layer 14 at the notch 1224 becomes larger, which facilitates to increase a bonding strength between the filter member 13 and the second molded portion 122 at the notch 1224, so as to prevent the filter member 13 from cracking due to insufficient bonding strength of the adhesive layer 14 at the notch 1224 of the second molded portion 122.

Preferably, as shown in FIG. 11A, the molded reinforcement portion 125 is integrally connected with the first molded portion 121, so as to form a reinforcement rib between the second outer side surface 1222 of the second molded portion 122 and the first upper surface 1211 of the first molded portion 121, thereby facilitating to enhance the connection strength between the second molded portion 122 and the first molded portion 121 at the notch 1224.

It is worth mentioning that, in other examples of the present invention, the molded reinforcement portion 125 may integrally extend from the second molded portion 122 to the third molded portion 123, so that one end of the molded reinforcement portion 125 is integrally connected with the second molded portion 122, and the other end of the molded reinforcement portion 125 is integrally connected with the third molded portion 123, thereby facilitating to further enhance the connection strength of the second molded portion 122 at the notch 1224.

In addition, in this modified implementation according to the present invention, the molded reinforcement portion 123 will extend the length of the notch 1224 of the second molded portion 122, so that the length of the air escape hole 1203 of the molded base 12 also becomes longer, thereby facilitating to further increase the difficulty of external dust entering the inner space 100 of the molded photosensitive assembly 10 through the air escape hole 1203. It is understandable that, as shown in FIG. 11B, since the molded reinforcement portion 123 protrudes from the second outer side surface 1222 of the second molded portion 122, thereby facilitating to guide a worker or machine to apply an adhesive at the molded reinforcement portion 123 (such as glue filling), so as to form the reinforcement adhesive piece 15. In addition, the molded reinforcement portion 123 may also prevent the adhesive from flowing freely before curing, so as to completely block the air escape hole 1203, and maximize the bonding strength between the filter member 13 and the second molded portion 122 at the notch 1224. It is worth noting that, in the second embodiment of the present invention, in addition to the above structure, other structures of the camera module 1 are the same as those of the camera module 1 according to the first embodiment of the present invention; moreover, the camera module 1 also has modified implementations similar to or the same as the various modified implementations of the camera module 1 of the first embodiment, which will not be repeated herein.

Figure 12:
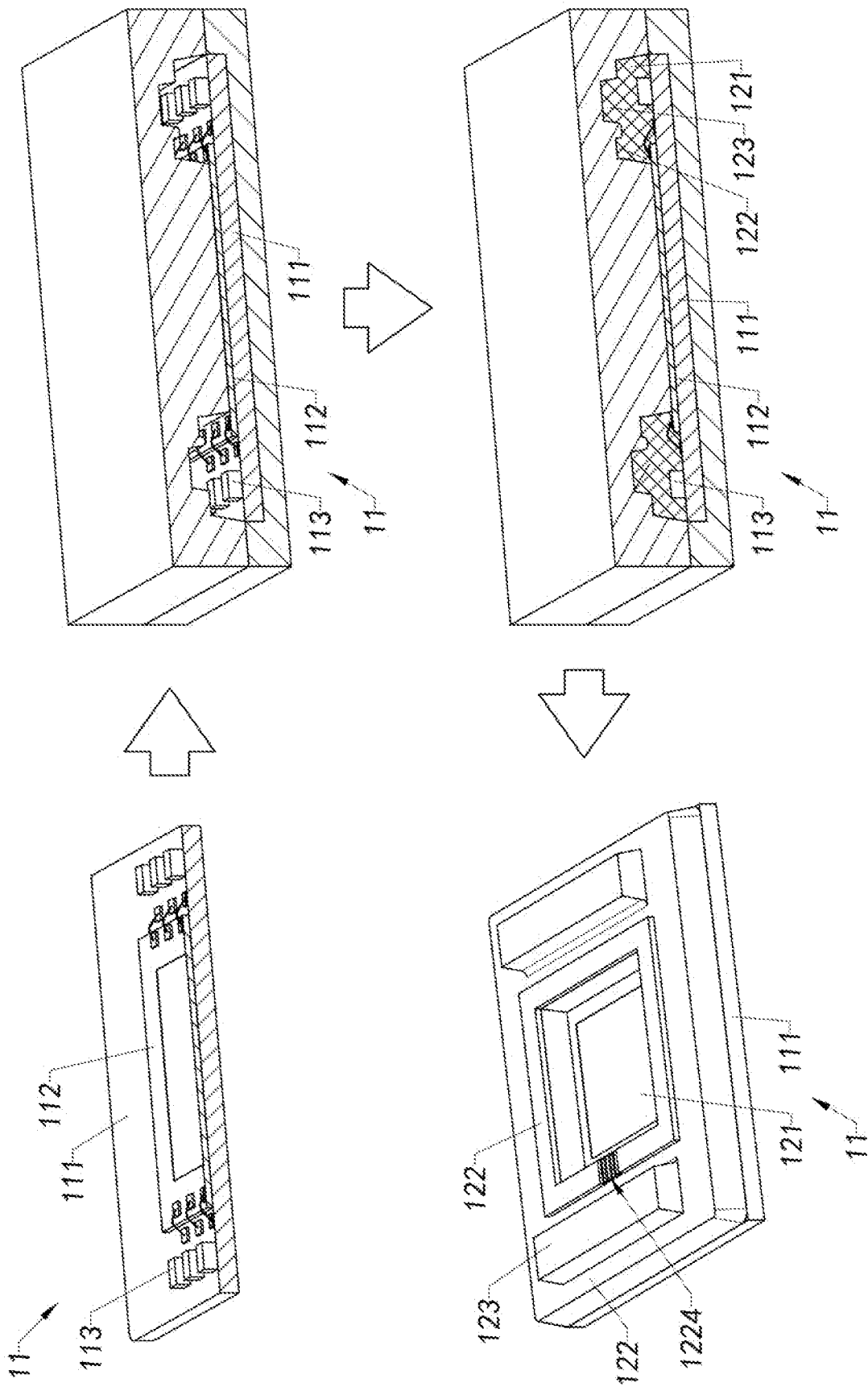
FIG. 12 shows a schematic diagram of the first manufacturing steps of the camera module according to a third embodiment of the present invention.
Figure 13A:
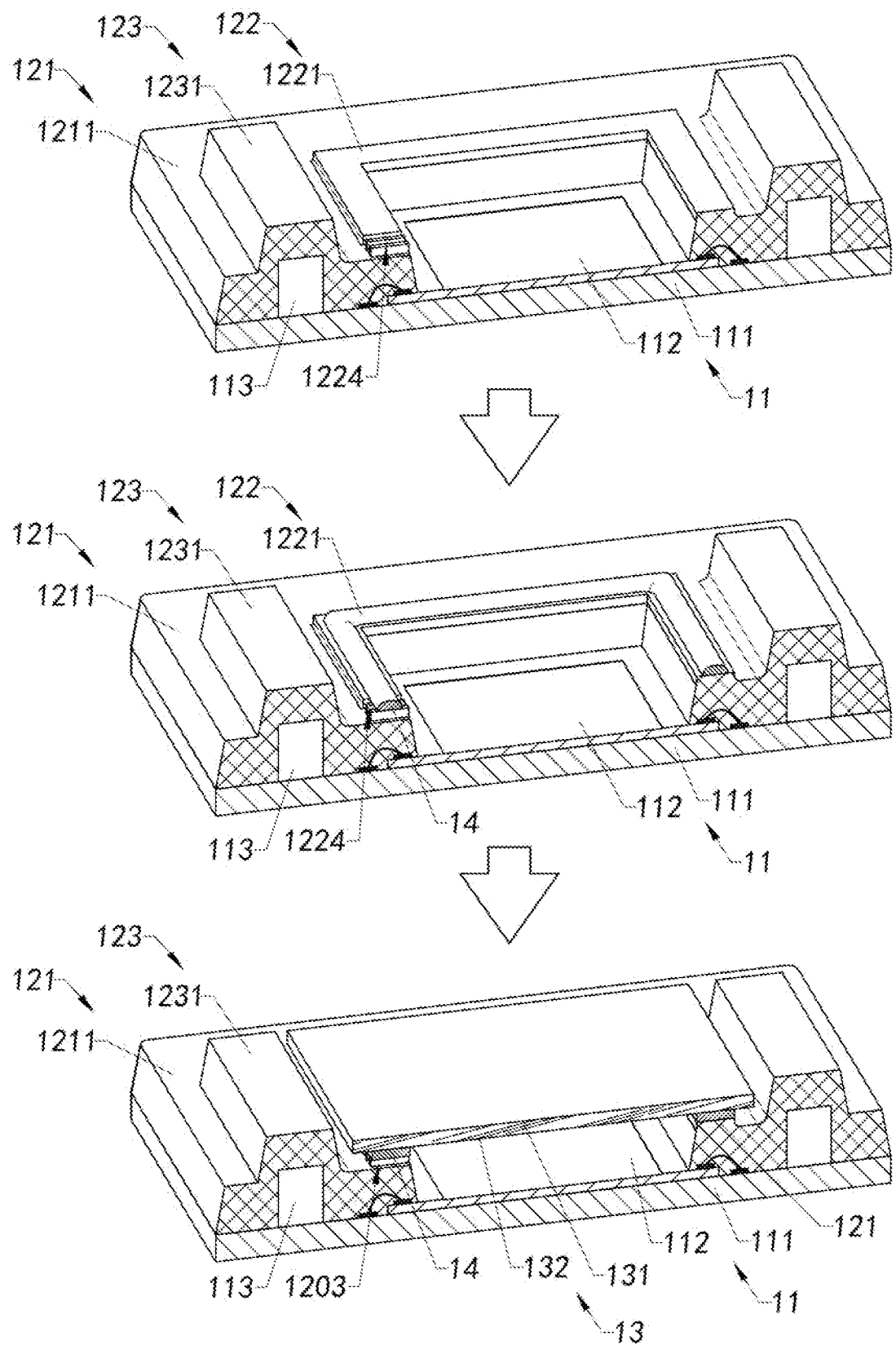
FIG. 13A shows a schematic diagram of the second manufacturing step of the camera module according to the third embodiment of the present invention.
Figure 13B:
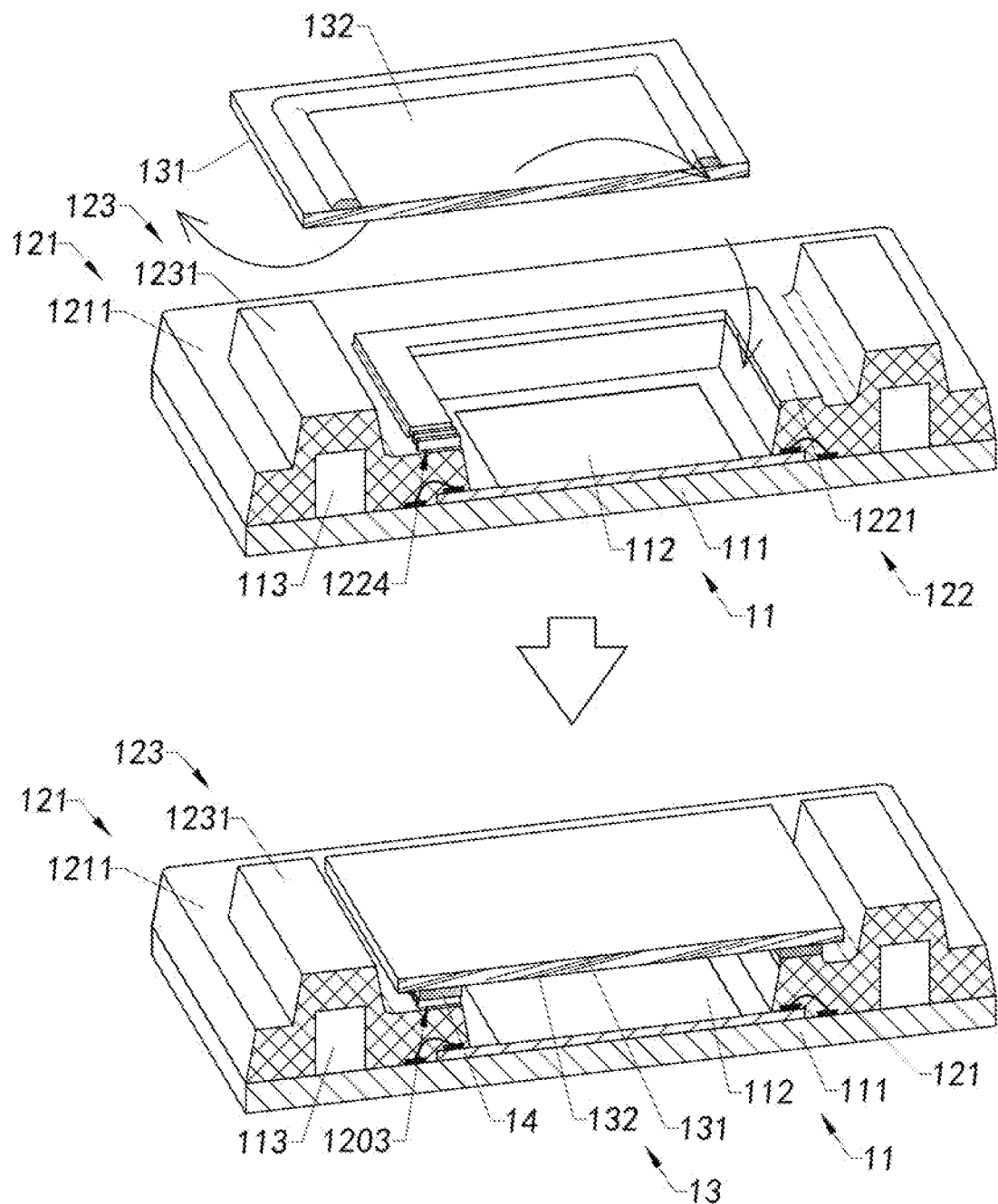
FIG. 13B shows a modified implementation of the second manufacturing step of the camera module according to the third embodiment of the present invention.
Figure 14:
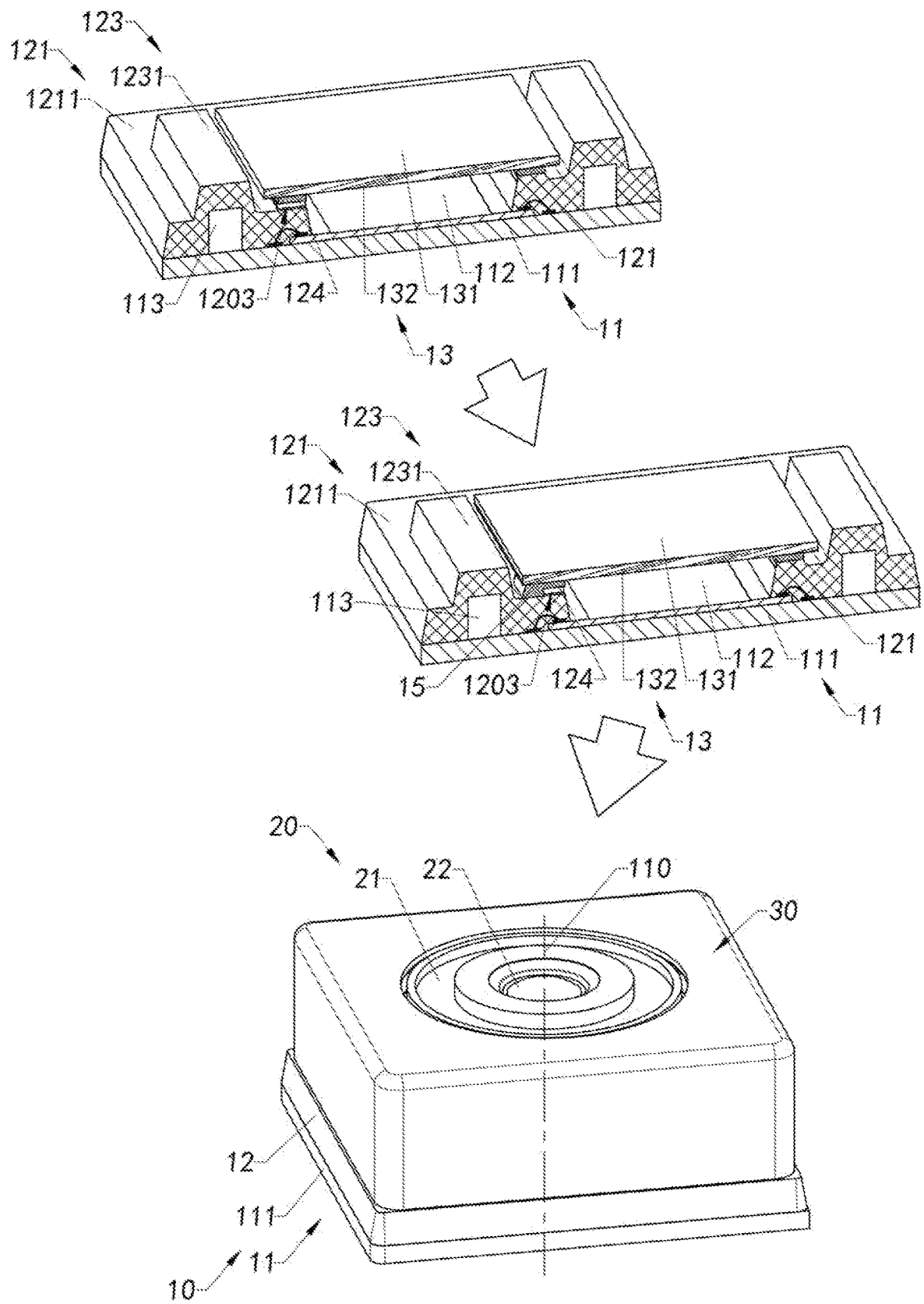
FIG. 14 shows a schematic diagram of the third manufacturing step of the camera module according to the third embodiment of the present invention.

It is worth mentioning that, referring to FIGS. 12-14, which are schematic diagrams of the manufacturing process of the molded photosensitive assembly 10 and the manufacturing process of the camera module 1 according to a third embodiment of the present invention; those skilled in the art should understand that, the manufacturing process of the molded photosensitive assembly 10 and the manufacturing process of the camera module 1 shown in FIGS. 12-14 are only examples to illustrate the features and advantages of the present invention, and they do not constitute limitation on the content and scope of the present invention.

Particularly, in FIG. 12, firstly the photosensitive element 112 is conductively mounted on the circuit board 111 to be assembled into the imaging assembly 11; then with the help of a forming mold, the first molded portion 121 of the molded base 12, the second molded portion 122 having the notch 1224, and the third molded portion 123 located at the outer side of the second molded portion 122 are molded on the imaging assembly 11, wherein the first upper surface 1211 of the first molded portion 121 is lower in the height direction than the second upper surface 1211 of the second molded portion 122, and the third molded portion 123 and the second molded portion 122 are spaced apart to form the outer space 1201 between the third molded portion 123 and the second molded portion 122. It is understandable that, the present invention may design an upper mold of the forming mold (such as a position, distribution and size of an protrusion in the upper mold, etc.), so as to form a notch or a groove (i.e., the outer space 1201) between the second molded portion 122 and the third molded portion 123 when molding the molded base 12, so that the edge of the filter member 13 may be accommodated in the outer space 1201 without avoiding the transition arc surface on the molded base 12, thereby effectively eliminating the adverse effect on the attachment of the filter member 13 generated by the transition arc surface on the molded base 12.

In FIG. 13A, firstly an adhesive is applied on the second upper surface 1211 of the second molded portion 122 of the molded base 12, then the filter member 13 is correspondingly disposed at the light window 120 of the molded base 12, and the adhesive layer 14 between the lower surface 131 of the filter member 13 and the second upper surface 1211 of the second molded portion 122 is formed by curing the adhesive, and the filter member 13 is firmly bonded to the second molded portion 122 of the molded base 12 by the adhesive layer 14, thereby assembling them into the molded photosensitive assembly 10. At the same time, the air escape hole 1203 of the molded base 12 is formed at the notch 1224 of the second molded portion 122, so that the internal space 100 of the mold photosensitive assembly 10 is communicated to the outside of the molded photosensitive assembly 10 through the air escape hole 1203, and the internal space 100 of the molded photosensitive assembly 10 is implemented as a non-closed space.

In a modified implementation shown in FIG. 13B, firstly an adhesive may also be correspondingly applied on the lower surface 131 of the filter member 13, then the filter member 13 is correspondingly disposed at the light window 120 of the molded base 12, the adhesive layer 14 between the lower surface 131 of the filter member 13 and the second upper surface 1211 of the second molded portion 122 is formed by curing the adhesive, and the filter member 13 is firmly bonded to the second molded portion 122 of the molded base 12 by the adhesive layer 14, thereby assembling them into the molded photosensitive assembly 10. At the same time, the air escape hole 1203 of the molded base 12 is formed at the notch 1224 of the second molded portion 122, so that the internal space 100 of the mold photosensitive assembly 10 is communicated to the outside of the molded photosensitive assembly 10 through the air escape hole 1203, and the internal space 100 of the molded photosensitive assembly 10 is implemented as a non-closed space.

It is worth noting that, in this embodiment of the present invention, a full circle of adhesive may be continuously applied to (but not limited to) the second molded portion 22 or the filter member 13, so as to form the adhesive layer 14 having a ring structure after curing the adhesive. Of course, in other examples of the present invention, an adhesive may also be applied intermittently on the second molded portion 22 or the filter member 13, so as to form the adhesive layer 14 having a non-annular structure after curing the adhesive, so that the air escape holes also may be formed at the discontinuities of the adhesive layer 14.

In FIG. 14, firstly the adhesive is applied again at the air escape hole 1203 of the molded base 12, so as to form the reinforcement adhesive piece 15 for blocking the air escape hole 1203 after curing the adhesive, so that the bonding strength of the adhesive layer 14 at the notch 1224 of the second molded portion 122 is enhanced by the reinforcement adhesive piece 15; then the optical lenses 20 is assembled in the driver 30, and the driver 30 is assembled on the third upper surface 1231 of the third molded portion 123 of the molded base 12, so that the optical lenses 20 is held in the photosensitive path 110 of the imaging assembly 11, thereby assembling them into the camera module 1.

Figure 16:
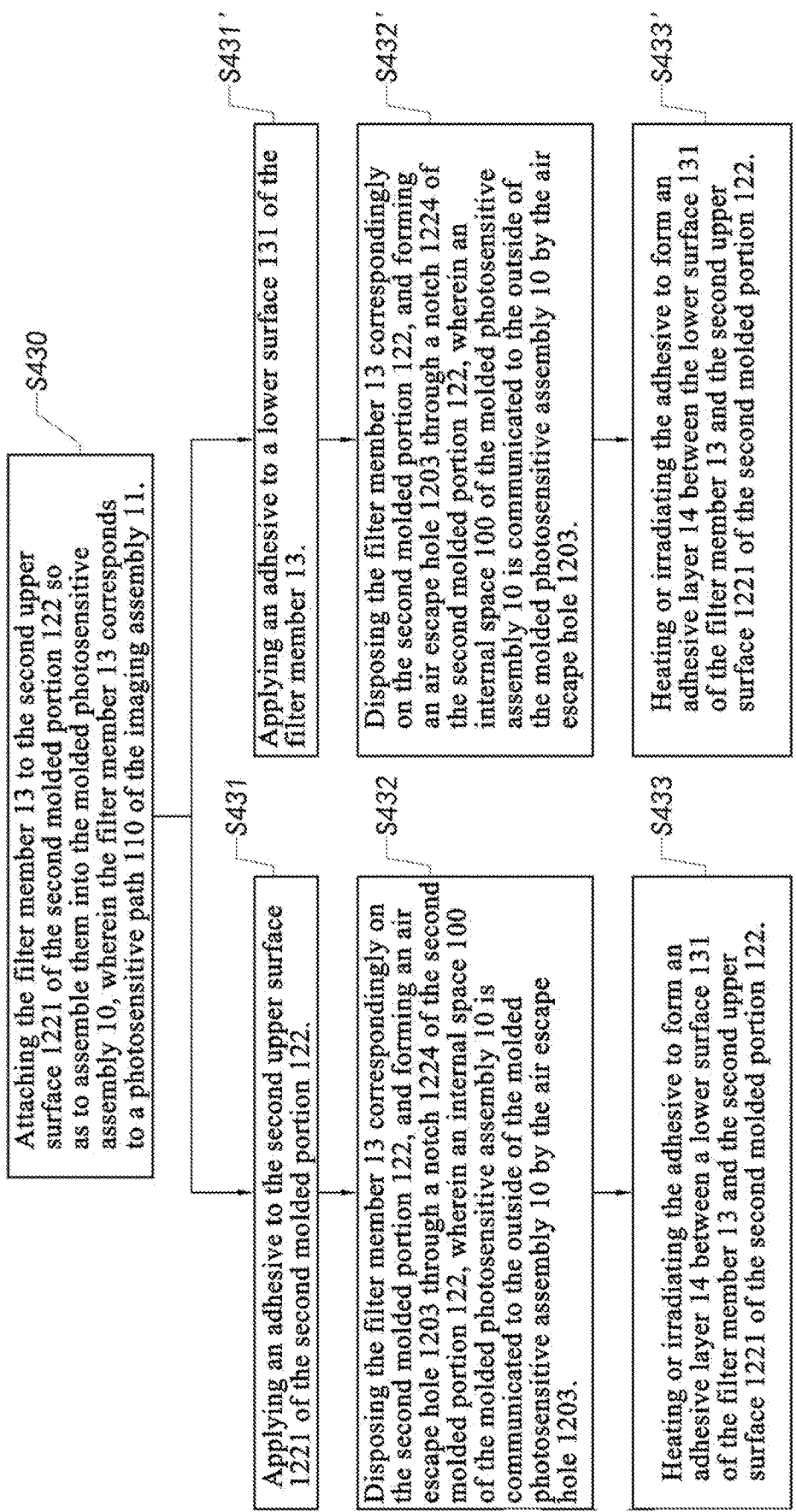
FIG. 16 shows a schematic flowchart of the process of bonding a filter member in the method for manufacturing the camera module according to the present invention.
Figure 17:
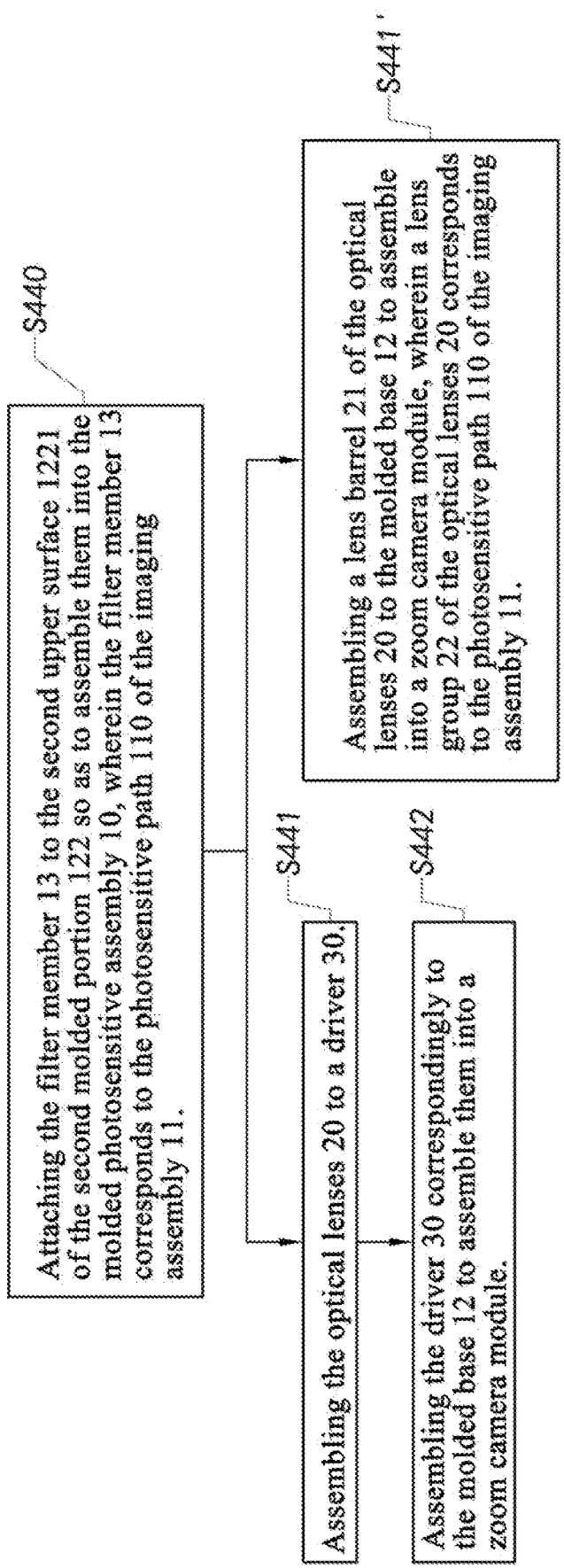
FIG. 17 shows a schematic flowchart of the process of assembling an optical lenses in the method for manufacturing the camera module according to the present invention.

According to another aspect of the present invention, referring to FIGS. 15-17, an embodiment of the present invention further provides a method for manufacturing a camera module. Particularly, as shown in FIG. 15, the manufacturing method of the camera module 1 includes the following steps:

S410: mounting a photosensitive element 112 conductively to a circuit board 111 to form an imaging assembly 11;

S420: forming a molded base 12 on the imaging assembly 11 by a forming mold, wherein the molded base 12 includes a first molded portion 121 and a second molded portion 122, the first molded portion 121 embeds a part of the imaging assembly 11, the second molded portion 122 is integrally formed on a first upper surface 1211 of the first molded portion 121, and a second upper surface 1221 of the second molded portion 122 is higher than the first upper surface 1211 of the first molded portion 121, so as to define and form an outer space 1201 by a second outer side surface 1222 of the second molded portion 122 and the first upper surface 1211 of the first molded portion 121;

S430: attaching a filter member 13 to the second upper surface 1221 of the second molded portion 122 so as to assemble them into a molded photosensitive assembly 10; and S440: disposing at least one optical lenses 20 correspondingly on the molded photosensitive assembly 10.

It is worth noting that, in this example of the present invention, as shown in FIG. 15, before the step S420, the method for manufacturing the camera module 1 may further include the following step:

S400: mounting a group of electronic components 113 on a circuit board 111 at intervals, wherein each of the electronic components 113 is respectively and conductively connected to the circuit board 111.

Further, in an example of the present invention, the molded base 12 further includes a third molded portion 123, wherein the third molded portion 123 is integrally formed on the first upper surface 1211 of the first molded portion 121, and the third molded portion 123 is located at outer side of the second molded portion 122, and the third molded portion 123 and the second molded portion 122 are spaced apart from each other, so as to form an outer space 1201 between a third inner side surface 1233 of the third molded portion 123 and the second outer side surface 1222 of the second molded portion 122.

In an example of the present invention, the second molded portion 122 of the molded base 12 is provided with at least one notch 1224, wherein the notch 1224 extends from a second inner side surface 1223 of the second molded portion 122 to the second outer side surface 1222 of the second molded portion 122.

It is worth mentioning that, in an example of the present invention, as shown in FIG. 16, the step S430 of the method for manufacturing the camera module 1 may include the following steps:

S431: applying an adhesive to the second upper surface 1221 of the second molded portion 122;

S432: disposing the filter member 13 correspondingly on the second molded portion 122, and forming an air escape hole 1203 through the notch 1224 of the second molded portion 122, wherein an internal space 100 of the molded photosensitive assembly 10 is communicated to the outside of the molded photosensitive assembly 10 by the air escape hole 1203; and S433: heating or irradiating the adhesive to form an adhesive layer 14 between a lower surface 131 of the filter member 13 and the second upper surface 1221 of the second molded portion 122.

In addition, in another example of the present invention, as shown in FIG. 16, the step S430 of the method for manufacturing the camera module 1 may also include the following steps:

S431': applying an adhesive to a lower surface 131 of the filter member 13;

S432': disposing the filter member 13 correspondingly on the second molded portion 122, and forming an air escape hole 1203 through a notch 1224 of the second molded portion 122, wherein an internal space 100 of the molded photosensitive assembly 10 is communicated to the outside of the molded photosensitive assembly 10 by the air escape hole 1203; and S433': heating or irradiating the adhesive to form an adhesive layer 14 between the lower surface 131 of the filter member 13 and the second upper surface 1221 of the second molded portion 122.

It is worth noting that, in an example of the present invention, as shown in FIG. 17, the step S440 of the method for manufacturing the camera module 1 may include the following steps:

S441: assembling the optical lenses 20 to a driver 30; and

S442: assembling the driver 30 correspondingly to the molded base 12 to assemble them into a zoom camera module.

In addition, in another example of the present invention, as shown in FIG. 17, the step S440 of the method for manufacturing the camera module 1 may also include the following step:

S441': assembling a lens barrel 21 of the optical lenses 20 to the molded base 12 to assemble into a zoom camera module, wherein a lens group 22 of the optical lenses 20 corresponds to the photosensitive path 110 of the imaging assembly 11.

Figure 18:
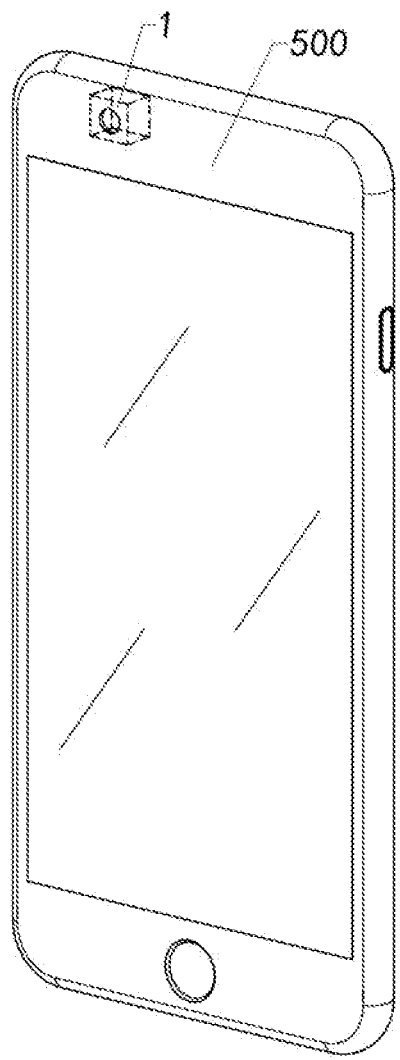
FIG. 18 is an example of an electronic device equipped with the camera module according to the present invention.

Referring to FIG. 18, according to another aspect of the present invention, the present invention further provides an electronic device, wherein the electronic device includes an electronic device body 500 and at least one camera module 1, and wherein each of the camera modules 1 is respectively disposed in the electronic device body 500 for acquiring images. It is worth mentioning that, the type of the electronic device body 500 is not limited. For example, the electronic device body 500 may be any electronic device that can be equipped with the camera module 1, e.g., a smart phone, a tablet computer, a notebook computer, an e-book, a personal digital assistant, a camera, etc. Those skilled in the art may understand that, although in FIG. 18 the electronic device body 500 is exemplarily implemented as a smart phone, it does not constitute a limitation to the content and scope of the present invention.

It is worth noting that, the orientation or positional relationship indicated by the terms including "upper", "lower", "inner", "outer" etc. in the present invention is based on the orientation or positional relationship shown in the drawings, which is only for the purpose of being convenient to describe the present invention and simplify the description, instead of indicating or implying that the mentioned device or element must have a specific orientation, be configured and operated in a specific orientation. For example, the surface of the first molded portion 121 away from the imaging assembly 11 is the first upper surface 1211 of the first molded portion 121, and the surface of the first molded portion 121 contacting the imaging assembly 11 is the lower surface of the first molded portion 121 (as shown in FIG. 3); for another example, the side of the first molded portion 121 adjacent to the light window 120 is the first inner side surface 1213 of the first molded portion 121, and the side of the first molded portion 121 away from the light window 120 is the first outer side surface 1221 of the first molded portion 121 (as shown in FIG. 3).

Those skilled in the art should understand that, the above description and the embodiments of the present invention shown in the drawings are only examples and do not limit the present invention. The purpose of the present invention has been completely and effectively achieved. The functions and structural principles of the present invention have been shown and explained in the embodiments. Without departing from the principles, the implementations of the present invention may have any variation or modification.

The invention claimed is:

1. A molded photosensitive assembly, characterized in that the molded photosensitive assembly comprises:
an imaging assembly;
a molded base, wherein the molded base includes:
   a first molded portion, wherein the first molded portion embeds a part of the imaging assembly, and the first molded portion has a first upper surface; and
   a second molded portion, wherein the second molded portion is integrally formed on the first upper surface of the first molded portion, and the second molded portion has a second upper surface and a second outer side surface; and
a filter member, wherein the filter member is correspondingly disposed on the second upper surface of the second molded portion;

wherein the second upper surface of the second molded portion is higher than the first upper surface of the first molded portion, so as to define and form an outer space by the second outer side surface of the second molded portion and the first upper surface of the first molded portion.

2. The molded photosensitive assembly according to claim 1, wherein the second upper surface of the second molded portion is a flat surface.

3. The molded photosensitive assembly according to claim 1, wherein the molded base further includes a third molded portion, and the third molded portion integrally extends upward from the first upper surface of the first molded portion, and the third molded portion is located at outer side of the second molded portion, and the third molded portion is spaced apart from the second molded portion.

4. The molded photosensitive assembly according to claim 3, wherein a distance between a third inner side surface of the third molded portion and the second outer side surface of the second molded portion is not less than 0.01 mm.

5. The molded photosensitive assembly according to claim 3, wherein the imaging assembly includes a circuit board, a photosensitive element conductively attached to the circuit board, and a group of electronic components conductively connected to the circuit board, and the third molded portion corresponds to the electronic components, and a third upper surface of the third molded portion is higher than top surfaces of the electronic components.

6. The molded photosensitive assembly according to claim 5, wherein the first upper surface of the first molded portion of the molded base is lower than the top surfaces of the electronic components.

7. The molded photosensitive assembly according to claim 5, wherein the third outer side surface of the third molded portion of the molded base is located at inner side of the first outer side surface of the first molded portion, so that a part of the first upper surface of the first molded portion outside the third molded portion is used for mounting at least one optical lenses.

8. The molded photosensitive assembly according to claim 7, wherein the molded base further includes a fourth molded portion, and the fourth molded portion is recessed downward from the first upper surface of the first molded portion, so as to form a peripheral groove on an outer periphery of the first molded portion; and a fourth upper surface of the fourth molded portion is used to provide a mounting surface for mounting the optical lenses.

9. The molded photosensitive assembly according to claim 7, wherein the molded base further includes a fourth molded portion, and the fourth molded portion extends upward from the first upper surface of the first molded portion, so as to form a peripheral protrusion on an outer periphery of the first molded portion; and a fourth upper surface of the fourth molded portion is used to provide a mounting surface for mounting the optical lenses.

10. The molded photosensitive assembly according to claim 5, wherein the third upper surface of the third molded portion of the molded base is higher than the second upper surface of the second molded portion.

11. The molded photosensitive assembly according to claim 10, wherein the third upper surface of the third molded portion is higher than an upper surface of the filter member, and the third upper surface of the third molded portion is adapted for corresponding to at least one optical lenses.

12. The molded photosensitive assembly according to claim 5, wherein the third molded portion is designed according to the size and position of the electronic components.

13. The molded photosensitive assembly according to claim 1, wherein a height difference between the second upper surface of the second molded portion and the first upper surface of the first molded portion is 0.03-0.2 mm.

14. The molded photosensitive assembly according to claim 1, further including an adhesive layer, wherein the adhesive layer is formed by curing an adhesive, and the adhesive layer is located between a lower surface of the filter member and the second upper surface of the second molded portion, so as to attach the filter member to the second upper surface of the second molded portion.

15. The molded photosensitive assembly according to claim 14, wherein a second inner side surface of the second molded portion is located at outer side of a first inner side surface of the first molded portion, so as to form an inner space inside the second molded portion.

16. The molded photosensitive assembly according to claim 1, wherein the second molded portion of the molded base is provided with at least one notch, so as to form an air escape hole at the notch of the second molded portion when the filter member is attached to the second upper surface of the second molded portion, so that an internal space of the molded photosensitive assembly is communicated to the outside of the molded photosensitive assembly through the air escape hole.

17. The molded photosensitive assembly according to claim 16, wherein the notch of the second molded portion extends laterally from the second inner side surface of the second molded portion to the second outer side surface of the second molded portion, so as to form the air escape hole arranged laterally.

18. The molded photosensitive assembly according to claim 17, wherein the molded base further includes a molded reinforcement portion, and wherein the molded reinforcement portion is formed at the notch of the second molded portion by integrally extending outward from the second molded portion.

19. The molded photosensitive assembly according to claim 18, wherein the molded reinforcement portion is integrally connected with the first molded portion, so as to form a reinforcement rib between the second outer side surface of the second molded portion and the first upper surface of the first molded portion.

20. The molded photosensitive assembly according to claim 16, further including a reinforcement adhesive piece, wherein the reinforcement adhesive piece is formed by curing an adhesive applied at the notch of the second molded portion.

* * * * *